United States Patent
Shiotsu et al.

(10) Patent No.: US 8,103,235 B2
(45) Date of Patent: Jan. 24, 2012

(54) COMMUNICATING APPARATUS, NOISE CANCELING METHOD AND MEMORY PRODUCT

(75) Inventors: Shinichi Shiotsu, Kawasaki (JP); Akira Shiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 12/289,333

(22) Filed: Oct. 24, 2008

(65) Prior Publication Data
US 2009/0197558 A1  Aug. 6, 2009

(30) Foreign Application Priority Data
Feb. 1, 2008 (JP) .................................. 2008-023122

(51) Int. Cl.
*H04B 1/10* (2006.01)
(52) U.S. Cl. ................ 455/296; 455/226.3; 455/303
(58) Field of Classification Search .................. 455/137, 455/296, 305, 303
See application file for complete search history.

(56) References Cited

U.S. PATENT DOCUMENTS

| | | | | |
|---|---|---|---|---|
| 4,977,615 A * | 12/1990 | Suzuki et al. | ............... | 455/277.2 |
| 5,315,185 A * | 5/1994 | Usimaru | ................ | 327/63 |
| 5,982,901 A * | 11/1999 | Kane et al. | ................ | 381/13 |
| 6,477,213 B1 * | 11/2002 | Miyoshi et al. | ................ | 375/347 |
| 6,925,293 B2 * | 8/2005 | Lindenmeier et al. | ..... | 455/276.1 |
| 6,947,716 B2 * | 9/2005 | Ono | .............................. | 455/273 |
| 7,158,773 B2 * | 1/2007 | Kurita et al. | .................. | 455/307 |
| 7,295,825 B2 * | 11/2007 | Raddant | ..................... | 455/277.1 |
| 7,373,129 B2 * | 5/2008 | Fukuda et al. | ................ | 455/296 |
| 7,936,852 B2 * | 5/2011 | Lindenmeier | ................ | 375/347 |
| 2004/0057496 A1 * | 3/2004 | Roeder | ......................... | 374/129 |
| 2004/0185815 A1 | 9/2004 | Fukuda et al. | | |
| 2005/0113048 A1 * | 5/2005 | Miyahara et al. | ............. | 455/137 |
| 2008/0153440 A1 * | 6/2008 | Rhee et al. | ..................... | 455/137 |

FOREIGN PATENT DOCUMENTS

| | | |
|---|---|---|
| JP | 2-233026 | 9/1990 |
| JP | 08-335915 | 12/1996 |
| JP | 2001-144696 | 5/2001 |
| JP | 2001-160788 | 6/2001 |
| JP | 2004-236171 | 8/2004 |

* cited by examiner

*Primary Examiner* — Thomas J Hiltunen
(74) *Attorney, Agent, or Firm* — Staas & Halsey LLP

(57) ABSTRACT

A phase and amplitude controller reads from a switching control table an antenna switching number and values of I and Q corresponding to a receiving channel number reported from a W-CDMA receiver module, and outputs the antenna switching number and the values of I and Q to a switch and DACs, respectively. After a phase and amplitude adjustment IC adjusts the phase and amplitude of a noise signal obtained through the switch by using the values of I and Q inputted through the DACs, it inverts the phase of the noise signal and adds the resulting signal to a reception signal received by a communication antenna, and consequently the noise component is canceled from the reception signal.

16 Claims, 16 Drawing Sheets

FIG.4

| RECEIVING CHANNEL NUMBER | ANTENNA SWITCHING NUMBER | I | Q |
|---|---|---|---|
| 1 | 1 | −63 | 1021 |
| 2 | 1 | −127 | 1015 |
| 3 | 1 | −190 | 1005 |
| 4 | 1 | −253 | 991 |
| 5 | 1 | −314 | 973 |
| 6 | 2 | −375 | 951 |
| 7 | 2 | −434 | 926 |
| 8 | 2 | −491 | 897 |
| ⋮ | ⋮ | ⋮ | ⋮ |

| RECEIVING CHANNEL NUMBER | ACTIVE APPLICATION | ANTENNA SWITCHING NUMBER | I | Q |
|---|---|---|---|---|
| 1 | VIDEO PLAY | 1 | −495 | 763 |
| | USB DEVICE | 3 | 234 | 359 |
| | OTHER | 2 | −705 | −889 |
| 2 | VIDEO PLAY | 1 | −483 | 694 |
| | USB DEVICE | 3 | 232 | 398 |
| | OTHER | 2 | −445 | −683 |
| 3 | VIDEO PLAY | 1 | −612 | 452 |
| | USB DEVICE | 3 | 124 | 235 |
| | OTHER | 2 | −555 | −234 |
| ⋮ | ⋮ | ⋮ | ⋮ | ⋮ |

| RECEIVING CHANNEL NUMBER | OPERATION MODE | ANTENNA SWITCHING NUMBER | I | Q |
|---|---|---|---|---|
| 1 | LCD OPENED STATE | 1 | −35 | 363 |
| | LCD CLOSED STATE | 2 | 234 | 359 |
| 2 | LCD OPENED STATE | 1 | −553 | 464 |
| | LCD CLOSED STATE | 2 | 131 | 395 |
| 3 | LCD OPENED STATE | 1 | −612 | 452 |
| | LCD CLOSED STATE | 2 | −453 | 135 |
| ⋮ | ⋮ | ⋮ | ⋮ | ⋮ |

| SETTING NUMBER | ANTENNA SWITCHING NUMBER | I | Q |
|---|---|---|---|
| 1 | 1 | -35 | 363 |
| 2 | 1 | 234 | 359 |
| 3 | 2 | -35 | 363 |
| 4 | 2 | 234 | 359 |
| 5 | 3 | -35 | 363 |
| 6 | 3 | 234 | 359 |

4a

COMMUNICATING APPARATUS, NOISE CANCELING METHOD AND MEMORY PRODUCT

CROSS-REFERENCE TO RELATED APPLICATION

This application is based upon and claims the benefit of priority of the prior Japanese Patent Application No. 2008-023122, filed on Feb. 1, 2008, the entire contents of which are incorporated herein by reference.

FIELD

The present invention relates to a communicating apparatus which receives reception signals from an external device on any of a plurality of receiving channels and optimally cancels a noise signal from a reception signal; a noise canceling method adopted by the communicating apparatus; and a memory product storing a computer program for realizing the communicating apparatus with a computer.

BACKGROUND

Conventionally, communicating apparatuses (for example, cell phones and notebook personal computers) having wireless interfaces for W-CDMA (Wideband-Code Division Multiple Access), WLAN (Wireless Local Area Network), one-segment broadcasting etc. have been popular. When using the wireless interface, such a communicating apparatus suffers from problems, such as deterioration of transmission band and interruption of communication caused by radio noise entering to the antenna of a wireless module from the inside of the main body.

In recent years, there has appeared an analog chip which picks up radio noise (a noise signal) near a noise source and cancels the radio noise from a reception signal (see, for example, Japanese Laid-Open Patent Publication No. 2004-236171). Moreover, as a method for canceling the radio noise from a reception signal, for example, there is a known method in which the radio noise is cancelled by inverting the phase of the noise signal from the noise source and adding the resulting signal to a reception signal as illustrated in FIG. 1 (see, for example, Japanese Laid-Open Patent Publication No. 08-335915).

FIG. 1 is a schematic view for explaining the prior art. In the example shown in FIG. 1, I and Q signals to be inputted into a phase and amplitude adjustment IC are combined to optimize communication quality information (for example BER: Bit Error Rate) outputted from a GPS (Global Positioning System) receiver module, and the phase and amplitude adjustment IC inverts the phase of a noise signal based on the I and Q signals and adds the resulting phase-inverted noise signal to a reception signal. Consequently, the radio noise is optimally cancelled from the reception signal.

SUMMARY

By the way, with the technique of canceling radio noise from a reception signal by inverting the phase of a noise signal picked up near the noise source and adding the resulting signal to the reception signal, if there are a plurality of noise sources, it is necessary to provide a noise capturing antenna and a phase and amplitude adjustment IC for each noise source, and thus this technique has a problem of an increase in the cost. Moreover, since the noise source affecting a reception signal is different according to a receiving channel when receiving the reception signal, it is difficult with the above-mentioned technique to cancel noise based on noise signals picked up from different noise sources according to receiving channels.

Accordingly, it is an object of the invention to provide an apparatus capable of performing a noise canceling process to optimally cancel a noise signal according to a receiving channel when receiving a reception signal, without increasing the cost.

According to an aspect of the invention, a communicating apparatus comprises receiving means for receiving a reception signal from an external device on any of a plurality of receiving channels, and cancels a noise signal from the reception signal received by the receiving means. The communicating apparatus comprises a plurality of detecting means for detecting noise signals generated from a plurality of noise sources, respectively, and a parameter table in which detecting-means information indicating any of the detecting means and preset noise canceling parameters are stored in association with each receiving channel. The communicating apparatus reads detecting-means information and noise canceling parameters corresponding to a receiving channel when receiving a reception signal by the receiving means from the parameter table, selects detecting means based on the read detecting-means information, and cancels a noise signal from the reception signal, based on a noise signal detected by the selected detecting means and the noise canceling parameters read from the parameter table.

In the communicating apparatus, the detecting-means information indicating detecting means for detecting a noise signal generated from each noise source affecting a reception signal received on each receiving channel and noise canceling parameters for canceling a noise signal from a reception signal received on each receiving channel are stored in association with each receiving channel in the parameter table. According to the communicating apparatus, it is possible to satisfactorily cancel noise signals that affect reception signals received on the respective receiving channels, based on the information read from the parameter table based on the receiving channels.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 4 is a schematic view showing the stored contents of a switching control table of Embodiment 1;

FIG. 8 is a schematic view showing the stored contents of a switching control table of Embodiment 2;

FIG. 11 is a schematic view showing the stored contents of a switching control table of Embodiment 3;

FIG. 13 is a schematic view showing the stored contents of a switching control table of Embodiment 4.

DESCRIPTION OF EMBODIMENTS

Embodiment 1

Figure 1:
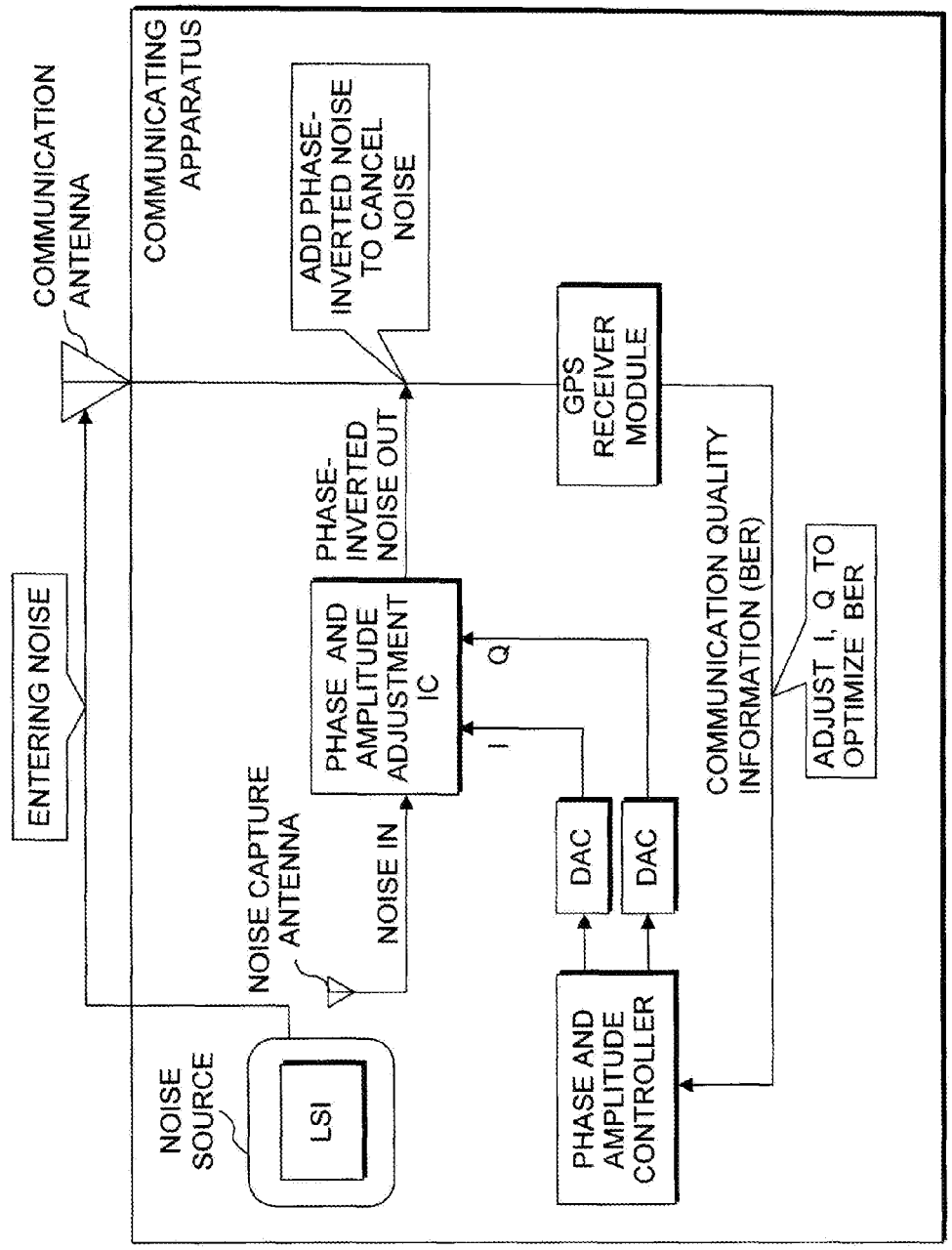
FIG. 1 is a schematic view for explaining a prior art.
Figure 2:
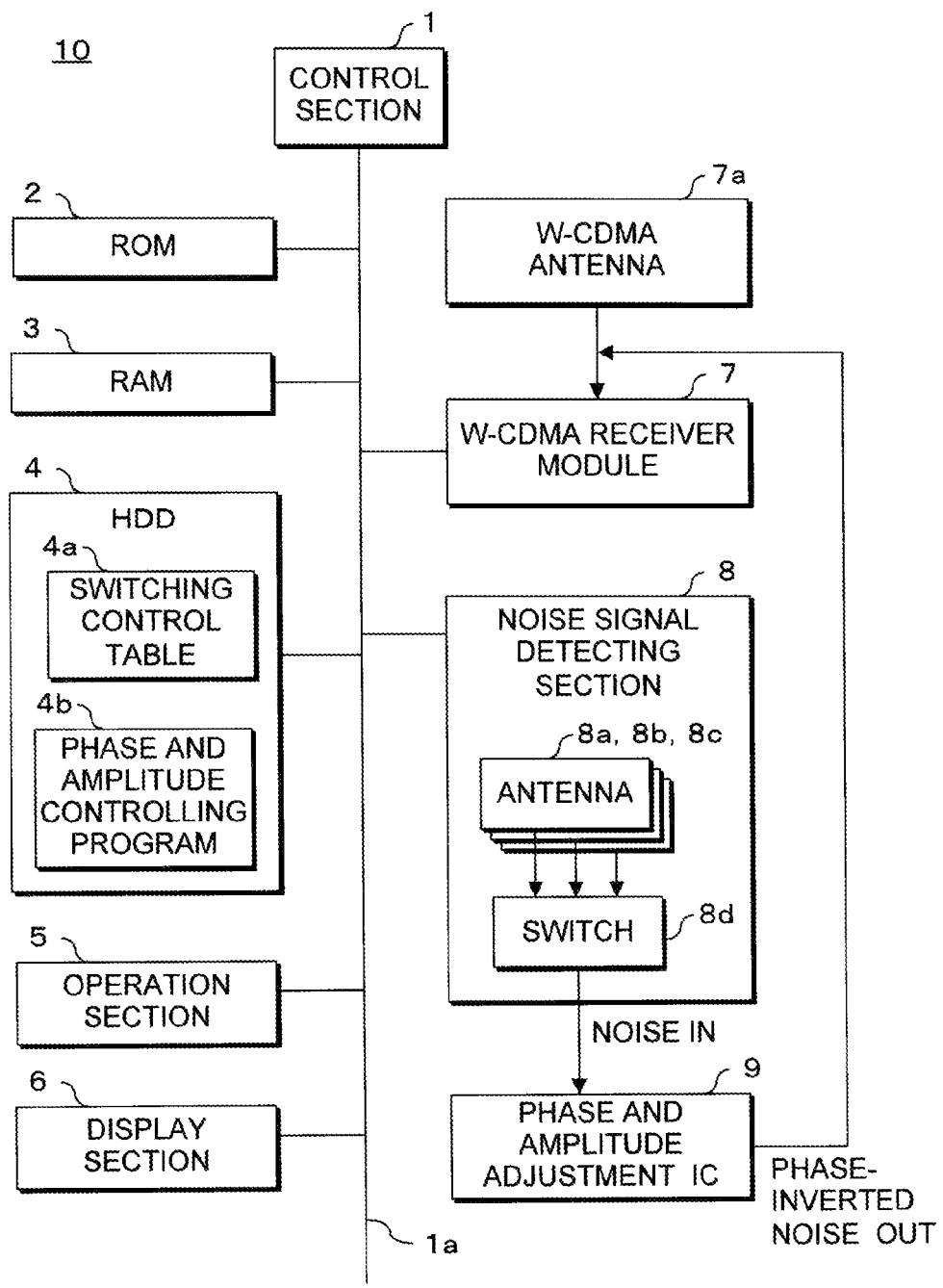
FIG. 2 is a block diagram showing the structure of a communicating apparatus of Embodiment 1.
Figure 3:
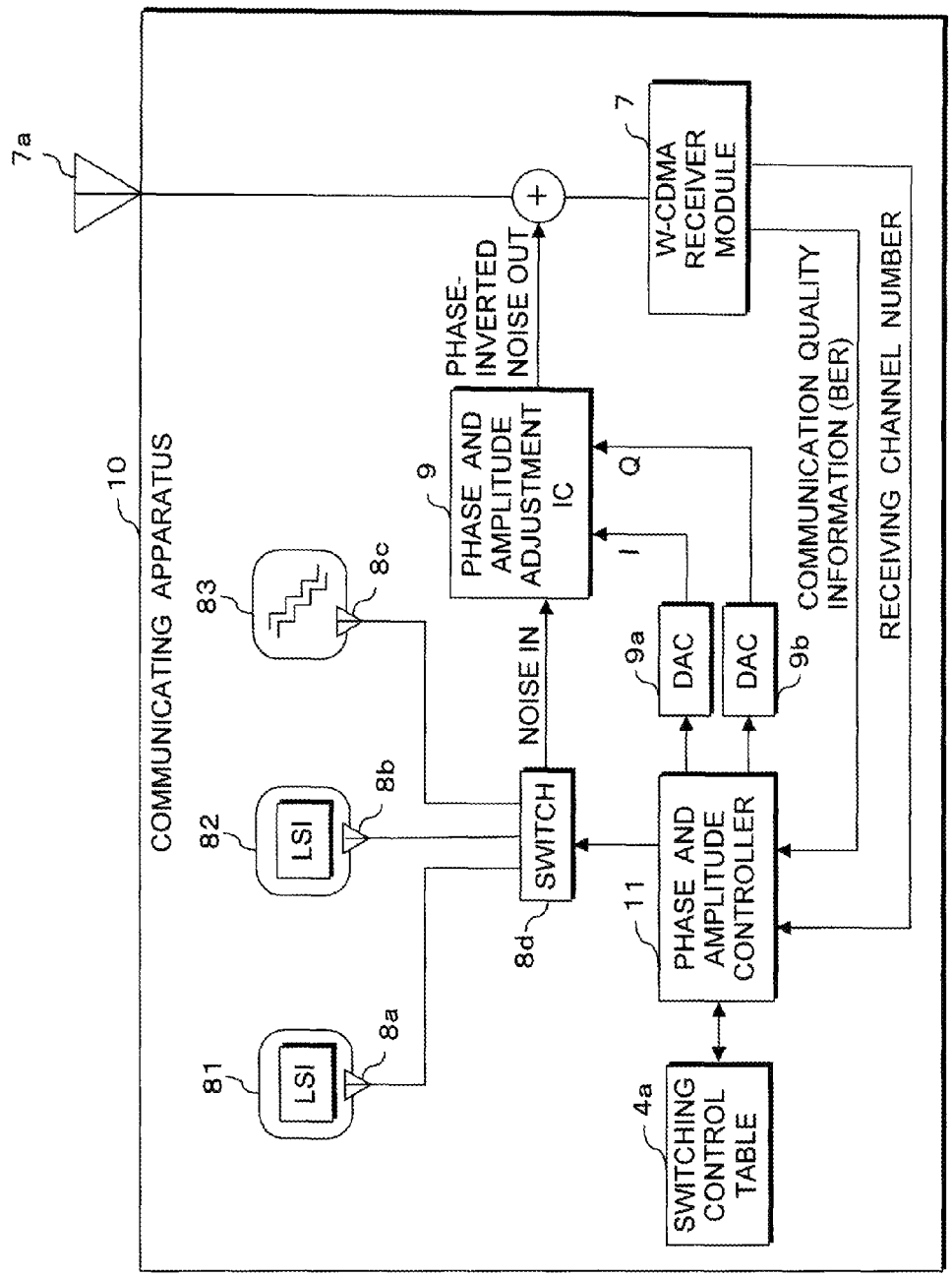
FIG. 3 is a functional block diagram showing the functions of a communicating apparatus of Embodiment 1.

A communicating apparatus disclosed in the present application will be explained in detail below based on the drawings illustrating Embodiment 1. FIG. 2 is a block diagram showing the structure of a communicating apparatus of Embodiment 1, and FIG. 3 is a functional block diagram showing the functions of the communicating apparatus of Embodiment 1. The arrows in FIGS. 2 and 3 show the flow of a signal.

A communicating apparatus 10 of Embodiment 1 is realized by, for example, reading and running a computer program disclosed in the present application with a notebook personal computer. It is also possible to construct the communicating apparatus disclosed in the present application with an apparatus including special hardware.

The communicating apparatus disclosed in the present application is applicable not only to personal computers, but also to apparatuses capable of performing wireless communication with other communicating apparatus over networks, and apparatuses capable of receiving one-segment broadcasting, such as cell phones and PDAs (Personal Digital Assistants).

The communicating apparatus 10 of Embodiment 1 is, for example, a known notebook personal computer, and comprises a control section 1, a ROM 2, a RAM 3, a HDD (Hard Disk Drive) 4, an operation section 5, a display section 6, a W-CDMA receiver module 7, a noise signal detecting section 8, and a phase and amplitude adjustment IC (Integrated Circuit) 9 as main components to operate as the communicating apparatus disclosed in the present application. These hardware units are connected to each other through a bus 1a.

The control section 1 is a CPU (Central Processing Unit) or MPU (Micro Processor Unit) having a clock (not shown), suitably reads a control program stored in the ROM 2 or the HDD 4 into the RAM 3 and runs the program according to predetermined timing shown by the clock, and also controls the operations of the above-described hardware units. The ROM 2 stores in advance various kinds of control programs necessary for the communicating apparatus 10 to operate as the communicating apparatus disclosed in the present application. The RAM 3 is an SRAM or a flash memory, and temporarily stores various data generated while the control section 1 is running the control programs.

The HDD 4 is a large-capacity storage device. The HDD 4 stores various kinds of control programs necessary for the communicating apparatus 10 to operate as the communicating apparatus disclosed in the present application, a switching control table (parameter table) 4a shown in FIG. 4, a phase and amplitude controlling program 4b, various application programs, and display information for reporting various kinds of information to a user who is operating the communicating apparatus 10.

The control section 1 realizes the operation of a phase and amplitude controller 11 shown in FIG. 3 by reading the phase and amplitude controlling program stored in the HDD 4 into the RAM 3 and running the program. The stored contents of the switching control table 4a and the operation of the phase and amplitude controller 11 will be described in detail later.

The operation section 5 is a keyboard, a mouse etc., and includes various kinds of operation keys necessary for the user to operate the communicating apparatus 10. When the user operates an operation key, the operation section 5 outputs a control signal corresponding to the operated operation key to the control section 1, and then the control section 1 runs the process corresponding to the control signal obtained from the operation section 5.

The display section 6 is a liquid crystal display (LCD), for example, and displays the operation state of the communicating apparatus 10, information inputted through the operation section 5, information to be reported to the user etc., according to an instruction from the control section 1.

The W-CDMA receiver module 7 is connected to a W-CDMA antenna (hereinafter referred to as the communication antenna) 7a, and is an interface for receiving through the communication antenna 7a information transmitted by a nearby base station according to the W-CDMA system. The communication antenna 7a is receiving means for receiving a radio wave transmitted from the nearby base station as a reception signal by using any of a plurality of receiving channels (reception frequency bands). The W-CDMA receiver module 7 specifies a receiving channel when receiving a reception signal with the communication antenna 7a, and obtains a radio wave transmitted in the specified receiving channel with the communication antenna 7a.

For example, when the communicating apparatus 10 communicates with other communicating apparatus, a receiving channel for receiving a radio wave is specified according to an instruction from the nearby base station. The communicating apparatus 10 may include an interface (module) for wireless communications such as WiMAX (Worldwide Interoperability for Microwave Access), WLAN and one-segment broadcasting, in addition to the W-CDMA receiver module 7. When receiving one-segment broadcasting, the communicating apparatus 10 specifies a receiving channel for receiving a radio wave according to an instruction from the user.

The noise signal detecting section 8 comprises a first noise capture antenna 8a, a second noise capture antenna 8b, a third noise capture antenna 8c, and a switch 8d. The communicating apparatus 10 has a plurality of noise sources (first noise source 81, second noise source 82, and third noise source 83) due to LSI (Large Scale Integration) constituting itself, wiring patterns, and connector sections. The first noise capture antenna 8a, second noise capture antenna 8b and third noise capture antenna 8c (detecting means) capture (detect) noise signals emitted from the noise sources 81, 82, and 83, respectively, and transmit them to the switch 8d.

The switch 8d switches the connections between the phase and amplitude adjustment IC 9 and the first noise capture antenna 8a, second noise capture antenna 8b and third noise capture antenna 8c, according to an instruction from the later-described phase and amplitude controller 11. Thus, the switch (selecting means) 8d selects the noise signals transmitted from the respective first noise capture antenna 8a, second noise capture antenna 8b and third noise capture antenna 8c, and transmits one of the noise signals to the phase and amplitude adjustment IC 9.

In Embodiment 1, the structure in which the communicating apparatus 10 has three noise sources 81, 82 and 83 is explained as an example, but the number of the noise sources is not limited to three. Moreover, as a structure for detecting a noise signal emitted from each noise source, if a power supply line or a ground line is affected by the noise signal emitted from each noise source, it may be possible to directly capture a signal from the power supply line or the ground line and extract a noise component (noise signal) from the captured signal, instead of using the noise capture antennas.

The phase and amplitude adjustment IC 9 is supplied with the value of I from the later-described phase and amplitude controller 11 through a DAC (Digital Analog Converter) 9a and the value of Q through a DAC 9b. The DACs 9a and 9b convert the values of I and Q of digital signals obtained from the phase and amplitude controller 11, respectively, into analog signals and output the analog signals to the phase and amplitude adjustment IC 9.

The phase and amplitude adjustment IC (canceling means) 9 cancels the noise component (noise signal) from the reception signal received by the communication antenna 7a, based on the noise signal inputted through the switch 8d and the values of I and Q inputted through the DACs 9a and 9b. More specifically, the phase and amplitude adjustment IC 9 obtains through the switch 8d the noise signal detected by either the noise capture antenna 8a, 8b or 8c, and adjusts the phase and amplitude of the obtained noise signal by using the values of I and Q inputted through the DACs 9a and 9b.

The phase and amplitude adjustment IC 9 inverts the phase of the signal (noise signal) whose phase and amplitude have been adjusted and adds the resulting signal to the reception signal received by the communication antenna 7a. Consequently, the noise component is canceled from the reception signal, and the reception signal from which the noise component was canceled is sent to the W-CDMA receiver module 7.

Here, the communication antenna 7a receives noise signals emitted from the noise sources 81, 81 and 82 in addition to the radio wave transmitted from the base station. Hence, as described above, by canceling the noise components from the reception signal received by the communication antenna 7a with the phase and amplitude adjustment IC 9, the noise components emitted from the noise sources 81, 82 and 83 and received by the communication antenna 7a are appropriately canceled from the reception signal.

The following will explain the stored contents of the switching control table 4a. FIG. 4 is a schematic view showing the stored contents of the switching control table 4a of Embodiment 1. In the switching control table 4a, as illustrated in FIG. 4, an antenna switching number and the values of I and Q as noise canceling parameters preset for each receiving channel are stored in association with each receiving channel number.

The receiving channel number is a number assigned to each receiving channel. The antenna switching number (detecting-means information) is a number indicating which of the first noise capture antenna 8a, second noise capture antenna 8b and third noise capture antenna 8c should be connected to the phase and amplitude adjustment IC 9 by the switch 8d, and indicates either the first noise capture antenna 8a, second noise capture antenna 8b, or third noise capture antenna 8d.

More specifically, when the antenna switching number "1" is inputted from the phase and amplitude controller 11, the switch 8d connects the first noise capture antenna 8a to the phase and amplitude adjustment IC 9 and transmits the noise signal obtained from the first noise capture antenna 8a to the phase and amplitude adjustment IC 9.

Similarly, when the antenna switching number "2" is inputted from the phase and amplitude controller 11, the switch 8d connects the second noise capture antenna 8b to the phase and amplitude adjustment IC 9 and transmits the noise signal obtained from the second noise capture antenna 8b to the phase and amplitude adjustment IC 9. When the antenna switching number "3" is inputted from the phase and amplitude controller 11, the switch 8d connects the third noise capture antenna 8c to the phase and amplitude adjustment IC 9 and transmits the noise signal obtained from the third noise capture antenna 8c to the phase and amplitude adjustment IC 9.

In the switching control table 4a, an optimum antenna switching number and values of I and Q are stored in advance for each channel. Such antenna switching number and values of I and Q are set for each receiving channel by conducting, for example, tests using a simulated base station in an anechoic chamber so that a reception signal received by the communication antenna 7a has the best communication quality. It is also possible to design the control section 1 to be capable of changing the stored contents of the switching control table 4a.

Although a plurality of noise sources 81, 82 and 83 are present in the communicating apparatus 10, when a receiving channel for receiving a reception signal is specified, a noise signal affecting a reception signal which is received in this receiving channel (the noise source 81, 82 or 83 that generates the noise signal) is also specified. Therefore, in the switching control table 4a, for each receiving channel, an antenna switching number and the values of I and Q that enable the phase and amplitude adjustment IC 9 to optimally cancel a noise signal (noise signal from either the noise source 81, 82 or 83) affecting a reception signal received on each receiving channel are stored.

The following will explain a phase and amplitude control process performed by the phase and amplitude controller 11. The control section 1 operates as the phase and amplitude controller 11 by successively reading a phase and amplitude controlling program 4a in the HDD 4 into the RAM 3 and running the program. When the W-CDMA receiver module 7 specifies a receiving channel for receiving a radio wave (reception signal) transmitted from a nearby base station by the communication antenna 7a, it reports the receiving channel number of the specified receiving channel to the phase and amplitude controller 11.

The phase and amplitude controller 11 successively stores the receiving channel number reported from the W-CDMA receiver module 7 in its memory (for example, the RAM 3) by rewriting. Based on whether the receiving channel number reported from the W-CDMA receiver module 7 matches the previously reported receiving channel number, that is, the receiving channel number stored in the memory, the phase and amplitude controller 11 determines whether or not the receiving channel for receiving a radio wave has been changed. When determined that the receiving channel has not been changed, the phase and amplitude controller 11 does nothing.

When determined that the receiving channel has been changed, the phase and amplitude controller (reading means) 11 reads the antenna switching number and the values of I and Q corresponding to the receiving channel number of the changed receiving channel from the switching control table 4a. The phase and amplitude controller 11 transmits the antenna switching number read from the switching control table 4a to the switch 8d, and transmits the value of I to the DAC 9a and the value of Q to the DAC 9b.

Thus, the switch 8d selects either the first noise capture antenna 8a, second noise capture antenna 8b or third noise capture antenna 8c, according to the antenna switching number obtained from the phase and amplitude controller 11, and transmits the noise signal obtained from the selected noise capture antenna 8a (or 8b or 8c) to the phase and amplitude adjustment IC 9. The phase and amplitude adjustment IC 9 adjusts the phase and amplitude of the noise signal obtained from the switch 8d by using the values of I and Q obtained through the DACs 9a and 9b, inverts the phase of the adjusted signal, and adds the resulting signal to a reception signal received by the communication antenna 7a.

With the above-mentioned process, when receiving a reception signal on each receiving channel, the phase and amplitude controller 11 can easily specify from the switching control table 4a the antenna switching number and values of I and Q for appropriately canceling the noise signal from the reception signal. Moreover, since the phase and amplitude adjustment IC 9 can perform a noise canceling process optimum for each receiving channel, based on the noise signal transmitted from the switch 8d according to the antenna switching number thus specified and the values of I and Q thus specified, it is possible to appropriately cancel the noise signal from a reception signal.

Further, the W-CDMA receiver module 7 detects communication quality information (for example, BER: Bit Error Rate) indicating the communication quality of a reception signal based on the reception signal received through the communication antenna 7a. When the W-CDMA receiver module 7 detects the communication quality information, it reports the detected communication quality information to the phase and amplitude controller 11. When the phase and amplitude controller 11 cancels the noise from the reception signal by transmitting the antenna switching number and values of I and Q read from the switching control table 4a to the switch 8d and DACS 9a and 9b, respectively, as described above, an adjustment process for finely adjusting the values of I and Q to be transmitted to the DACs 9a and 9b based on the communication quality information reported from the W-CDMA receiver module 7 is performed.

In the adjustment process for the values of I and Q, a predetermined value (for example, 5) is added to the values of I and Q, which are read from the switching control table 4a and used as reference values, a predetermined value (for example, 5) is subtracted from the values of I and Q, the resulting values are respectively transmitted to the DACs 9a and 9b to cancel noise signals from reception signals, and the communication quality information of the reception signals are compared to specify the values of I and Q that can provide the best communication quality.

With the above-mentioned process, when receiving a reception signal through the communication antenna 7a, the communicating apparatus 10 of Embodiment 1 can add a signal based on a noise signal detected by the noise capture antenna 8a (or 8c or 8c) corresponding to a receiving channel to the reception signal, and therefore it is possible to optimally cancel the noise signal from the reception signal. Moreover, by only performing the process of referring to the switching control table 4a by the phase and amplitude controller 11, it is possible to easily specify the noise capture antenna 8a (or 8b or 8c) that detects a noise signal to be canceled from a reception signal and the values of I and Q for adjusting the noise signal.

Figure 5:
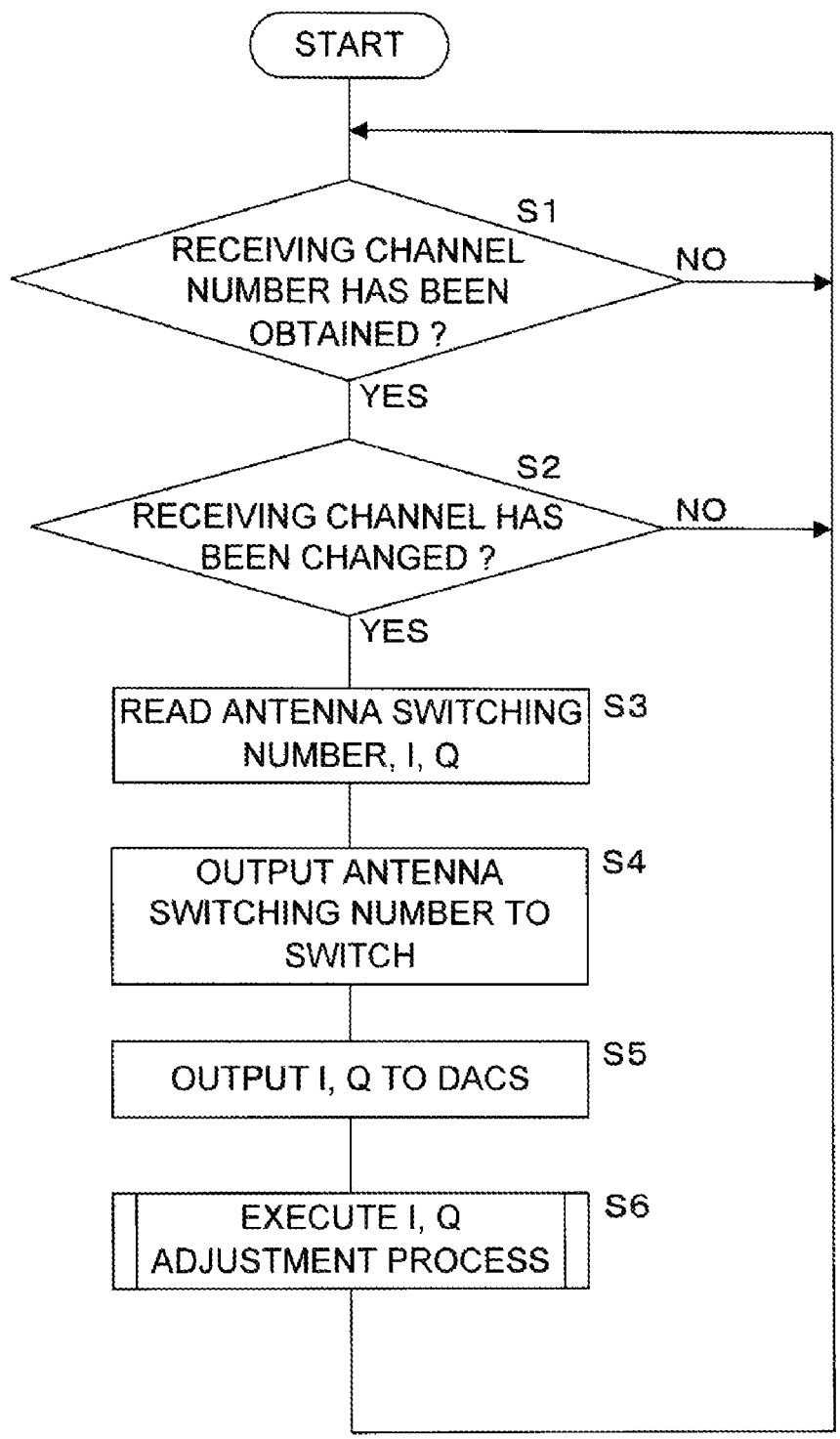
FIG. 5 is a flow chart showing the steps of a phase and amplitude control process of Embodiment 1.

The following will explain, based on the flow chart, the phase and amplitude control process performed by the phase and amplitude controller 11 in the communicating apparatus 10 having the above-described structure. FIG. 5 is the flow chart showing the steps of the phase and amplitude control process of Embodiment 1. The following process is executed by the control section 1, according to the phase and amplitude controlling program 4b stored in the HDD 4 of the communicating apparatus 10.

The control section 1 (phase and amplitude controller 11) of the communicating apparatus 10 determines whether or not a receiving channel number has been obtained from the W-CDMA receiver module 7 (S1). When the control section 1 determines that a receiving channel number has not been obtained (S1: NO), it waits while performing other process. When determined that a receiving channel number has been obtained (S1: YES), the control section 1 determines whether or not the receiving channel for receiving a reception signal has been changed (S2). When determined that the receiving channel has not been changed (S2: NO), the control section 1 returns the process to step S1 and waits while performing other process.

When the control section 1 determines that the receiving channel has been changed (S2: YES), it reads the antenna switching number and the values of I and Q corresponding to the changed receiving channel from the switching control table 4a (S3). The control section 1 outputs the antenna switching number read from the switching control table 4a to the switch 8d (S4), and outputs the values of I and Q read from the switching control table 4a to the DACs 9a and 9b, respectively (S5).

Moreover, the control section 1 executes the adjustment process for finely adjusting the values of I and Q transmitted to the DACs 9a and 9b, based on the communication quality information reported from the W-CDMA receiver module 7 (S6), returns the process to step S1, and repeats the process of steps S3 to S6 whenever the receiving channel is changed.

Figure 6A:
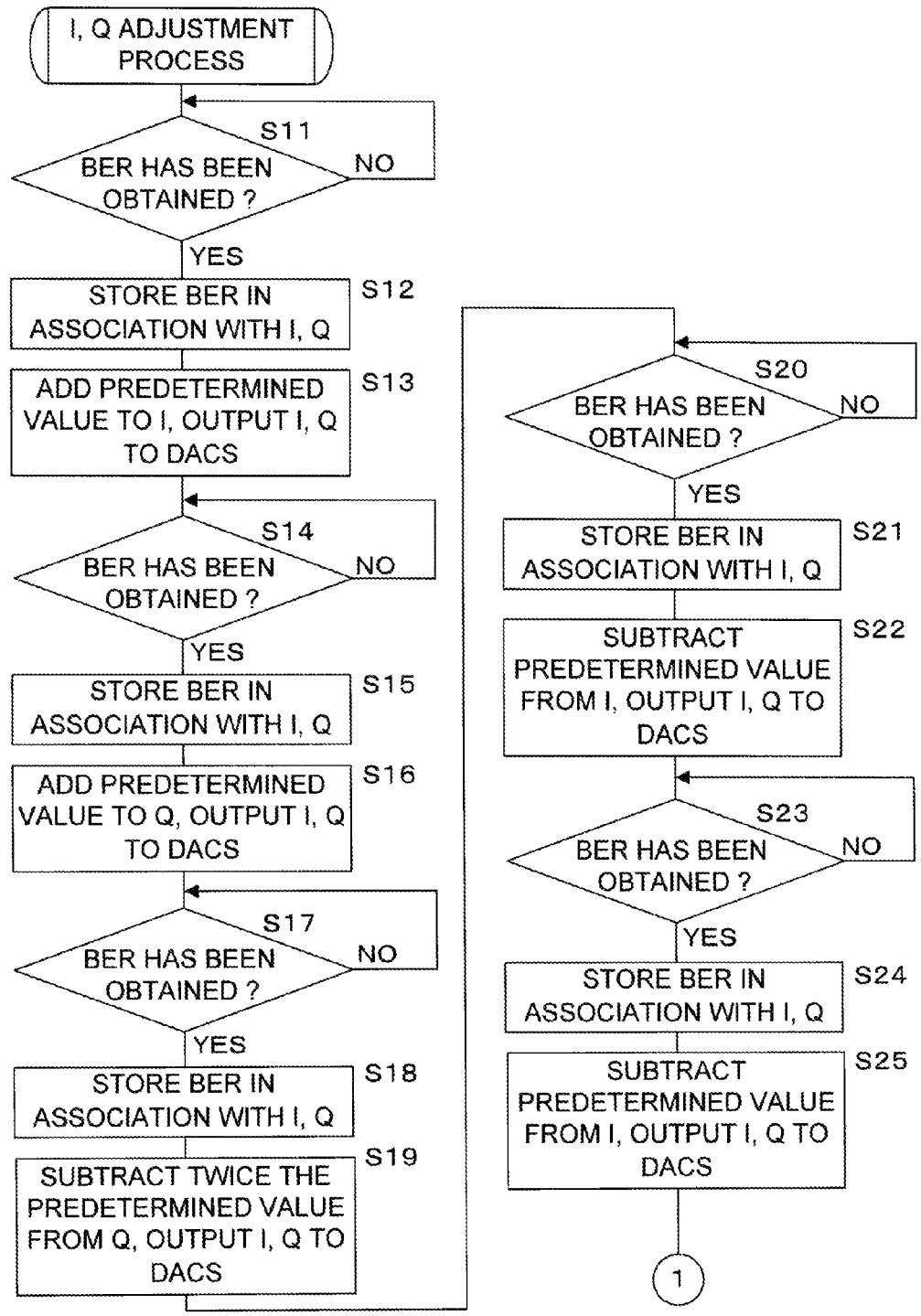
FIGS. 6A and 6B are flow charts showing the steps of a process of adjusting the values of I and Q.
Figure 6B:
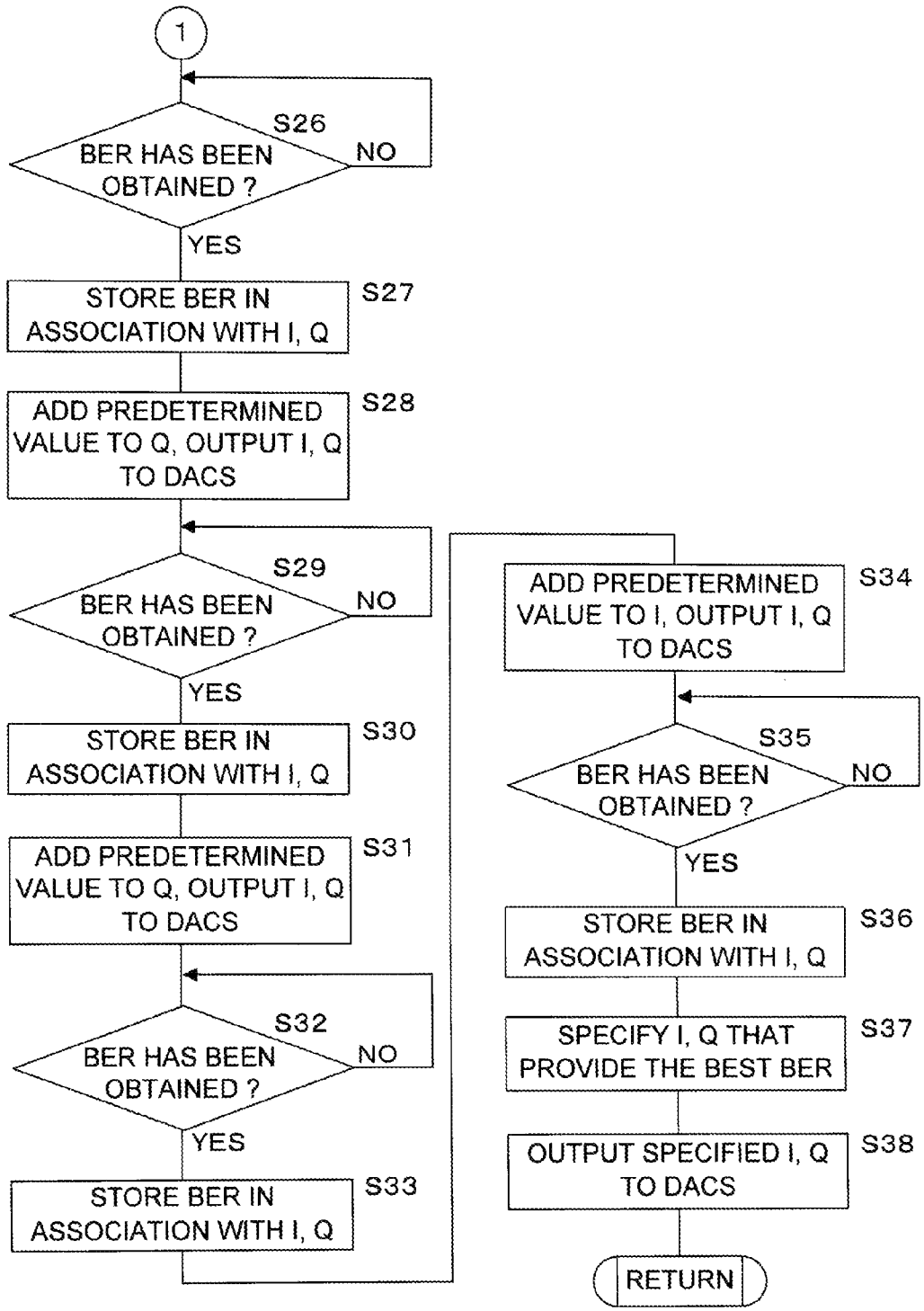

The following will explain, based on the flow chart, the process of adjusting the values of I and Q (step S6 in FIG. 4) in the above-described phase and amplitude control process. FIGS. 6A and 6B are the flow charts showing the steps of the process of adjusting the values of I and Q. The following process is executed by the control section 1, according to the phase and amplitude controlling program 4b stored in the HDD 4 of the communicating apparatus 10.

The control section 1 (phase and amplitude controller 11) of the communicating apparatus 10 determines whether or not communication quality information (hereinafter referred to as BER) has been obtained from the W-CDMA receiver module 7 (S11). When the control section 1 determines that the BER has not been obtained (S11: NO), it waits while performing other process. When the control section 1 determines that the BER has been received (S11: YES), it stores the BER in the RAM 3 in association with the values of I and Q at this time, namely the values of I and Q outputted to the DACs 9a and 9b in step S5 shown in FIG. 5 (hereinafter referred to as the reference values of I and Q) (S12).

The control section 1 adds a predetermined value to only the value of I and outputs the values of I and Q to the DACs 9a and 9b, respectively (S13). The control section 1 determines whether or not the BER has been obtained from the W-CDMA receiver module 7 (S14). When the control section 1 determines that the BER has not been obtained (S14: NO), it waits until the BER is obtained. When the control section 1 determines that the BER has been obtained (S14: YES), it stores the BER in the RAM 3 in association with the values of I and Q at this time, namely the reference value of Q and the value of I obtained by adding the predetermined value to the reference value of I (S15).

The control section 1 adds the predetermined value to the value of Q and outputs the values of I and Q to the DACs 9a and 9b, respectively (S16). The control section 1 determines whether or not the BER has been obtained from the W-CDMA receiver module 7 (S17). When the control section 1 determines that the BER has not been obtained (S17: NO), it waits until the BER is obtained. When the control section 1 determines that the BER has been obtained (S17: YES), it stores the BER in the RAM 3 in association with the values of I and Q at this time, namely the value of I obtained by adding the predetermined value to the reference value of I and the value of Q obtained by adding the predetermined value to the reference value of Q (S18).

The control section 1 subtracts a value that is twice the predetermined value from the value of Q and outputs the values of I and Q to the DACs 9a and 9b, respectively (S19). The control section 1 determines whether or not the BER has been obtained from the W-CDMA receiver module 7 (S20). When the control section 1 determines that the BER has not been obtained (S20: NO), it waits until the BER is obtained. When the control section 1 determines that the BER has been obtained (S20: YES), it stores the BER in the RAM 3 in association with the values of I and Q at this time, namely the value of I obtained by adding the predetermined value to the reference value of I and the value obtained by subtracting the predetermined value from the reference value of Q (S21).

The control section 1 subtracts the predetermined value from the value of I and outputs the values of I and Q to the DACs 9a and 9b, respectively (S22). The control section 1 determines whether or not the BER has been obtained from the W-CDMA receiver module 7 (S23). When the control section 1 determines that the BER has not been obtained (S23: NO), it waits until the BER is obtained. When the control section 1 determines that the BER has been obtained (S23: YES), it stores the BER in the RAM 3 in association with the values of I and Q at this time, namely the reference value of I and the value of Q obtained by subtracting the predetermined value from the reference value of Q (S24).

The control section 1 subtracts the predetermined value from the value of I and outputs the values of I and Q to the DACs 9a and 9b, respectively (S25). The control section 1 determines whether or not the BER has been obtained from the W-CDMA receiver module 7 (S26). When the control section 1 determines that the BER has not been obtained (S26: NO), it waits until the BER is obtained. When the control section 1 determines that the BER has been obtained (S26: YES), it stores the BER in the RAM 3 in association with the values of I and Q at this time, namely the value of I obtained by subtracting the predetermined value from the reference value of I and the value of Q obtained by subtracting the predetermined value from the reference value of Q (S27).

The control section 1 adds the predetermined value to the value of Q and outputs the values of I and Q to the DACs 9a and 9b, respectively (S28). The control section 1 determines whether or not the BER has been obtained from the W-CDMA receiver module 7 (S29). When the control section 1 determines that the BER has not been obtained (S29: NO), it waits until the BER is obtained. When the control section 1 determines that the BER has been obtained (S29: YES), it stores the BER in the RAM 3 in association with the values of I and Q at this time, namely the value of I obtained by subtracting the predetermined value from the reference value of I and the reference value of Q (S30).

The control section 1 adds the predetermined value to the value of Q and outputs the values of I and Q to the DACs 9a and 9b, respectively (S31). The control section 1 determines whether or not the BER has been obtained from the W-CDMA receiver module 7 (S32). When the control section 1 determines that the BER has not been obtained (S32: NO), it waits until the BER is obtained. When the control section 1 determines that the BER has been obtained (S32: YES), it stores the BER in the RAM 3 in association with the values of I and Q at this time, namely the value of I obtained by subtracting the predetermined value from the reference value of I and the value of Q obtained by adding the predetermined value to the reference value of Q (S33).

The control section 1 adds the predetermined value to the value of I and outputs the values of I and Q to the DACs 9a and 9b, respectively (S34). The control section 1 determines whether or not the BER has been obtained from the W-CDMA receiver module 7 (S35). When the control section 1 determines that the BER has not been obtained (S35: NO), it waits until the BER is obtained. When the control section 1 determines that the BER has been obtained (S35: YES), it stores the BER in the RAM 3 in association with the values of I and Q at this time, namely the reference value of I and the value of Q obtained by adding the predetermined value to the reference value of Q (S36).

The control section 1 compares the BERs stored in the RAM 3 in the steps S12, S15, S18, S21, S24, S27, S30, S33 and S36, and specifies the values of I and Q that provide the best BER (S37). Then, the control section 1 outputs the specified values of I and Q to the DACs 9a and 9b, respectively (S38), finishes the above-described adjustment process for the values of I and Q, and returns the process to the phase and amplitude control process shown in FIG. 5.

As described above, the communicating apparatus 10 of Embodiment 1 switches the noise signals (noise signals detected by the noise capture antenna 8a, 8b, 8c) to be inputted to the phase and amplitude adjustment IC 9, according to a receiving channel when receiving a reception signal, and also switches the values of I and Q to be inputted to the phase and amplitude adjustment IC 9. Thus, since the communicating apparatus 10 can optimally cancel the noise signal contained in a reception signal received on each receiving channel, according to the receiving channel, it is possible to improve the communication quality of a reception signal and obtain the reception signal with good communication quality.

Embodiment 1 described above illustrates, as an example, a structure in which when the phase and amplitude controller 11 determines that the receiving channel reported from the W-CDMA receiver module 7 has been changed, it switches the antenna switching number to be transmitted to the switch 8d and the values of I and Q to be transmitted to the DACs 9a and 9b. In addition to such a structure, for example, it may be possible to construct a structure in which, for example, the receiving channel reported from the W-CDMA receiver module 7 is periodically monitored, and the antenna switching number and the values of I and Q are switched according to the receiving channel at each monitored time.

Embodiment 2

Figure 7:
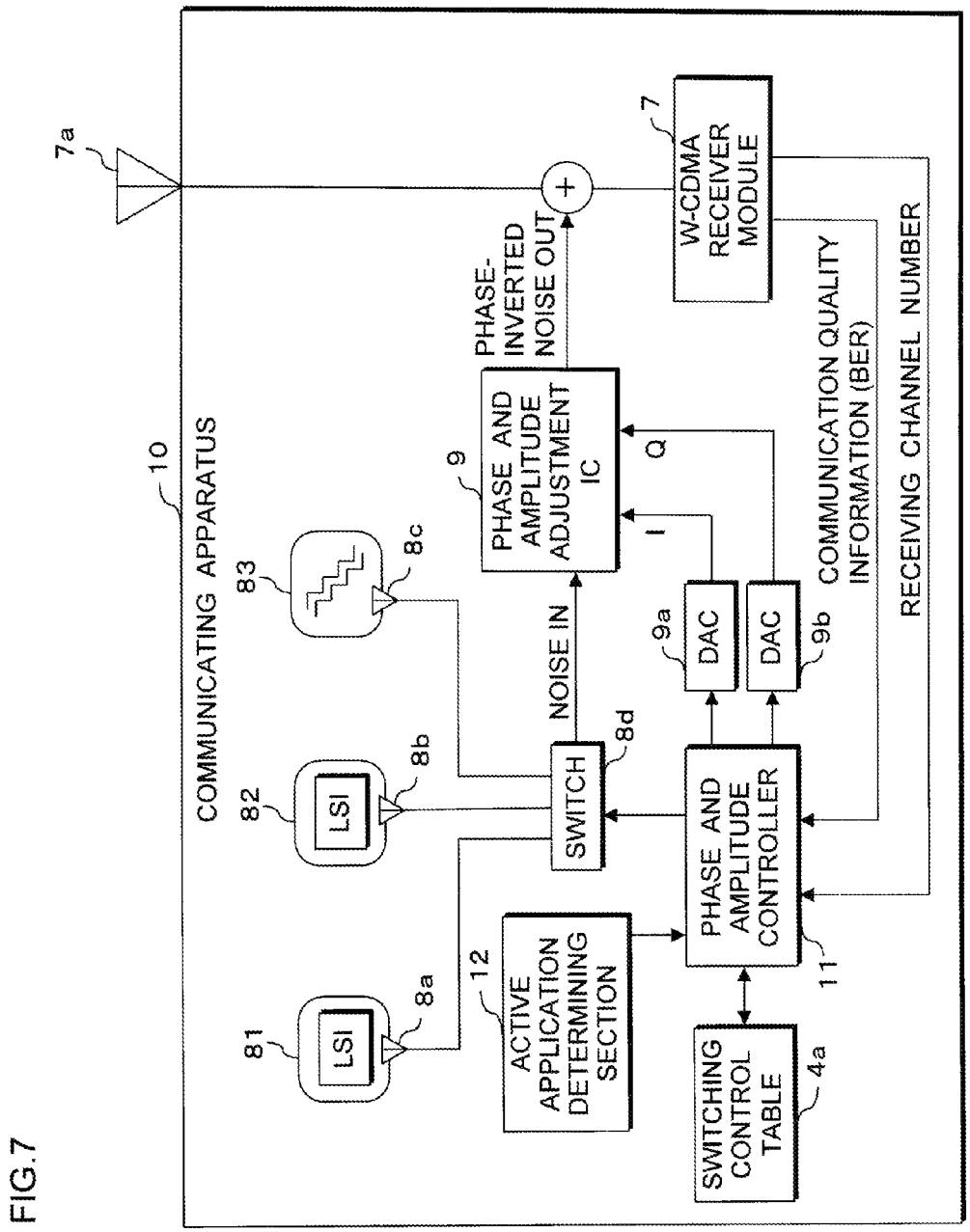
FIG. 7 is a functional block diagram showing the functions of a communicating apparatus of Embodiment 2.

The following will explain in detail a communicating apparatus of the present invention, based on the drawings illustrating Embodiment 2. FIG. 7 is a functional block diagram showing the functions of the communicating apparatus of Embodiment 2. Since the communicating apparatus of Embodiment 2 has structures similar to the above-described communicating apparatus 10 of Embodiment 1, similar structures are designated with the same codes and the explanation thereof is omitted.

The communicating apparatus 10 of Embodiment 1 controls the switching operation of the switch 8d and the values of I and Q to be inputted to the phase and amplitude adjustment IC 9, according to a receiving channel when receiving a reception signal. The communicating apparatus 10 of Embodiment 2 controls the switching operation of the switch 8*d* and the values of I and Q to be inputted to the phase and amplitude adjustment IC 9, according not only to a receiving channel when receiving a reception signal, but also to the kind of an application program being run.

More specifically, the communicating apparatus 10 of Embodiment 2 stores an active application determining program (not shown) in the HDD 4, and the control section 1 realizes the operation of an active application determining section 12 shown in FIG. 7 by reading the active application determining program into the RAM 3 and running the program.

The HDD 4 stores various kinds of application programs. The function of each application program is realized when the control section 1 (executing means) reads the application program stored in the HDD 4 into the RAM 3 and runs the program according to an instruction from a user through the operation section 5. The active application determining section (determining means) 12 determines the application program being run by the control section 1 (the active application program) and reports the determined application program to the phase and amplitude controller 11. Examples of the application programs include a video play program for playing videos, and a program for the process of USB devices for transmitting and receiving information to/from an external device connected through a USB (Universal Serial Bus).

In the communicating apparatus 10, even when reception signals are received on the same receiving channel, the noise sources 81, 82 and 83 that affect the reception signals may be different depending on the application program being run at that time. In Embodiment 2, therefore, the switching operation of the switch 8*d* and the values of I and Q to be inputted to the phase and amplitude adjustment IC 9 are appropriately controlled according not only to a receiving channel when receiving a reception signal, but also to the kind of the application program being run. Consequently, it is possible to perform the accurate noise canceling process.

In Embodiment 2, the switching control table 4*a* stored in the HDD 4 of the communicating apparatus 10 is a switching control table 4*a* as shown in FIG. 8. FIG. 8 is a schematic view showing the stored contents of the switching control table 4*b* of Embodiment 2. As shown in FIG. 8, in the switching control table 4*a* of Embodiment 2, the antenna switching number and the values of I and Q, which are noise canceling parameters preset for each receiving channel, are stored corresponding to each receiving channel number and information indicating an application program (active application).

In the column of active application, either the video play program (shown as "Video Play" in FIG. 8), the USB device program (shown as "USB Device" in FIG. 8), or other program (indicated as "Other" in FIG. 8) is stored. Therefore, in the switching control table 4*a* of Embodiment 2, for each receiving channel and each application program, an antenna switching number and values of I and Q capable of optimally canceling noise signals (noise signals from the noise sources 81, 82, 83) affecting reception signals, according to the kind of the application program being run (active) when receiving a reception signal on each receiving channel, are stored.

The following will explain a phase and amplitude control process performed by the phase and amplitude controller 11 of Embodiment 2. As explained in Embodiment 1, the phase and amplitude controller 11 determines, based on the receiving channel number reported from the W-CDMA receiver module 7, whether or not the receiving channel when receiving a radio wave has been changed. The phase and amplitude controller 11 successively stores the active application program information reported from the active application determining section 12 in its memory by rewriting. Based on whether or not the active application program reported from the active application determining section 12 matches the previously reported active application program, that is, the active application program stored already in the memory, the phase and amplitude controller 11 determines whether or not the active application program has been changed.

When determined that the receiving channel has not been changed, or that the active application program has not been changed, the phase and amplitude controller 11 does nothing. When determined that the receiving channel has been changed, the phase and amplitude controller 11 reads from the switching control table 4*a* the antenna switching number and the values of I and Q corresponding to, the receiving channel number of the changed receiving channel and the active application program information at this time. Moreover, when the phase and amplitude controller 11 determines that the active application program has been changed, it reads from the switching control table 4*a* the antenna switching number and the values of I and Q corresponding to, the receiving channel number at this time and the information about the changed active application program.

The phase and amplitude controller 11 transmits the antenna switching number read from the switching control table 4*a* to the switch 8*d*, and transmits the value of I to the DAC 9*a* and the value of Q to the DAC 9*b*. Then, the switch 8*d* selects either the first noise capture antenna 8*a*, second noise capture antenna 8*b*, or third noise capture antenna 8*c*, according to the antenna switching number obtained from the phase and amplitude controller 11, and transmits a noise signal obtained from the selected noise capture antenna 8*a* (or 8*b* or 8*c*) to the phase and amplitude adjustment IC 9.

Thus, when receiving a reception signal on each receiving channel, the phase and amplitude controller 11 can easily specify from the switching control table 4*a* the antenna switching number and values of I and Q for appropriately canceling the noise signal from the reception signal, according to the active application program at this time. Further, the phase and amplitude adjustment IC 9 adjusts the phase and amplitude of the noise signal inputted from the switch 8*d* according to such an antenna switching number by using the values of I and Q inputted through the DACs 9*a* and 9*b*, inverts the phase of the adjusted signal, and adds the resulting signal to a reception signal received by the communication antenna 7*a*, thereby appropriately canceling the noise signal from the reception signal. Consequently, the W-CDMA receiver module 7 can obtain the reception signal from which the noise signal was appropriately canceled.

Note that the adjustment process in which the phase and amplitude controller 11 finely adjusts the values of I and Q to be transmitted to the DACs 9*a* and 9*b*, based on the communication quality information reported from the W-CDMA receiver module 7, is similar to the process explained in Embodiment 1.

With the above-mentioned process, when receiving a reception signal through the communication antenna 7*a*, the communicating apparatus 10 of Embodiment 2 can add to the reception signal a signal based on a noise signal detected by the noise capture antenna 8*a* (or 8*c* or 8*c*) corresponding to the receiving channel and the application program being run at this time, and therefore it is possible to optimally cancel the noise signal from the reception signal. Moreover, with only the process in which the phase and amplitude controller 11 refers to the switching control table 4*a*, it is possible to easily specify the noise capture antenna 8a (or 8b or 8c) for detecting a noise signal to be canceled from the reception signal, and the values of I and Q.

Figure 9:
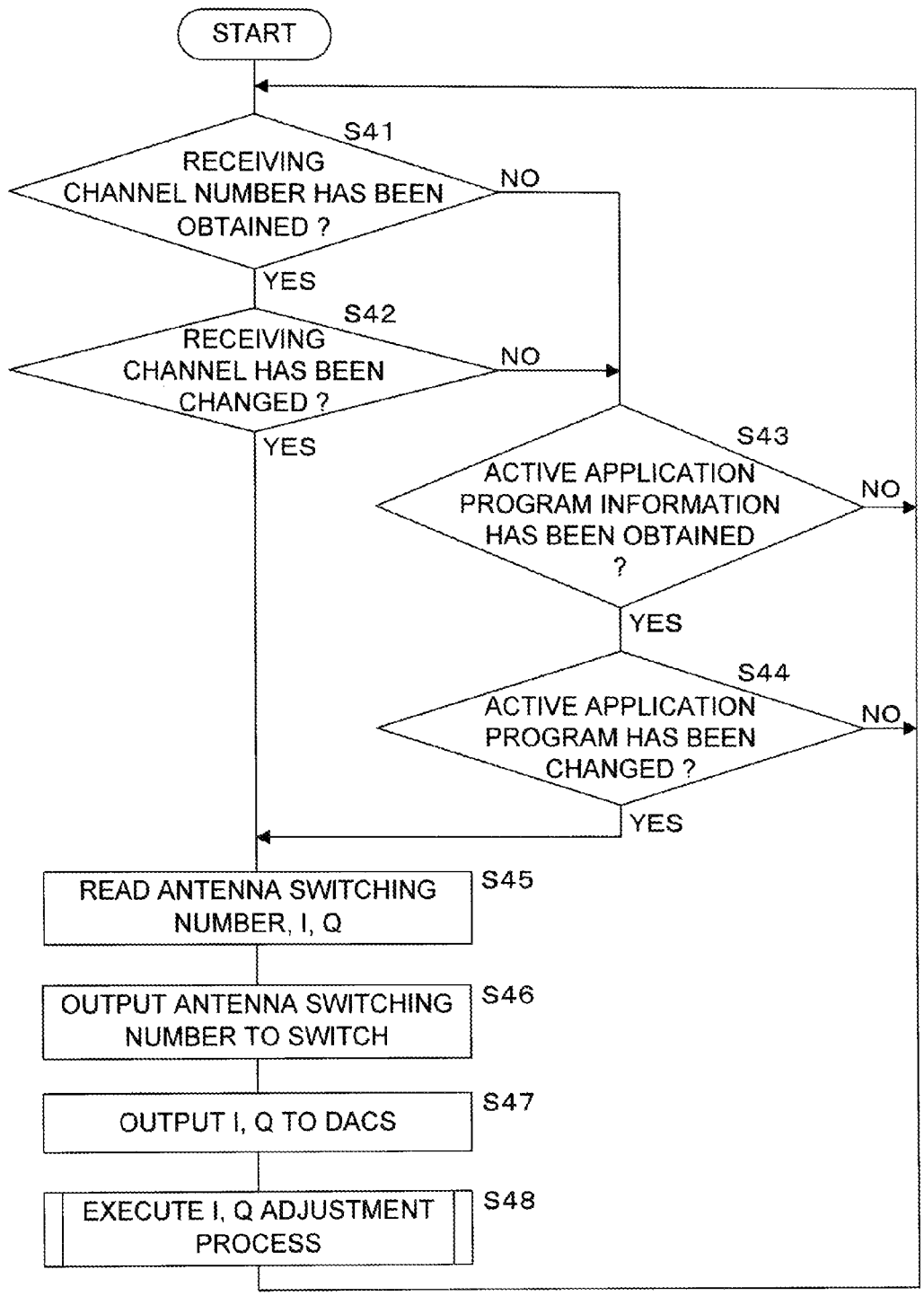
FIG. 9 is a flow chart showing the steps of a phase and amplitude control process of Embodiment 2.

The following will explain, based on the flow chart, the phase and amplitude control process performed by the phase and amplitude controller 11 in the communicating apparatus 10 having the above-described structure. FIG. 9 is the flow chart showing the steps of the phase and amplitude control process of Embodiment 2. The following process is executed by the control section 1 according to the phase and amplitude controlling program 4b stored in the HDD 4 of the communicating apparatus 10.

The control section 1 (phase and amplitude controller 11) of the communicating apparatus 10 determines whether or not a receiving channel number has been obtained from the W-CDMA receiver module 7 (S41). When determined that a receiving channel number has been obtained (S41: YES), the control section 1 determines whether or not the receiving channel for receiving a reception signal has been changed (S42). When determined that the receiving channel has been changed (S42: YES), the control section 1 moves the process to step S45.

When determined that a receiving channel number has not been obtained (S41: NO), or that the receiving channel has not been changed (S42: NO), the control section 1 determines whether or not the active application program information has been obtained from the active application determining section 12 (S43). When the control section 1 determines that the active application program information has been obtained (S43: YES), it determines whether or not the active application program has been changed (S44). When determined that the active application program has been changed (S44: YES), the control section 1 moves the process to step S45.

When determined that the active application program information has not been obtained (S43: NO), or that the active application program has not been changed (S44: NO), the control section 1 returns the process to step S41 and waits until the receiving channel is changed, or the active application program is changed, while performing other process.

When determined that the receiving channel has been changed (S42: YES), or that the active application program has been changed (S44: YES), the control section 1 reads the antenna switching number and the values of I and Q corresponding to the receiving channel and the active application program at this time from the switching control table 4a (S45). The control section 1 outputs the antenna switching number read from the switching control table 4a to the switch 8d (S46), and outputs the values of I and Q read from the switching control table 4a to the DACS 9a and 9b, respectively (S47).

Further, the control section 1 executes the adjustment process for finely adjusting the values of I and Q transmitted to the DACs 9a and 9b, based on the communication quality information reported from the W-CDMA receiver module 7 (S48), and returns the process to step S41. The control section 1 repeats the process of steps S45 to S48 whenever the receiving channel or the active application program is changed. Note that the adjustment process for the values I and Q in step S48 is the process explained with reference to FIGS. 6A and 6B.

As described above, based on a receiving channel when receiving a reception signal and on an active application program, the communicating apparatus 10 of Embodiment 2 switches the noise signals (noise signals detected by the noise capture antenna 8a, 8b, 8c) to be inputted to the phase and amplitude adjustment IC 9, and also switches the values of I and Q to be inputted to the phase and amplitude adjustment IC 9. Thus, since the communicating apparatus 10 can optimally cancel the noise signal contained in a reception signal received on each receiving channel, according to the receiving channel and the active application program, it is possible to improve the communication quality of a reception signal, and it is possible to obtain the reception signal with good communication quality.

Embodiment 2 described above illustrates, as an example, a structure in which when the phase and amplitude controller 11 determines that the receiving channel reported from the W-CDMA receiver module 7 has been changed, or that the active application program reported from the active application determining section 12 has been changed, it switches the antenna switching number to be transmitted to the switch 8d and the values of I and Q to be transmitted to the DACs 9a and 9b. In addition to such a structure, for example, it may be possible to construct a structure in which the receiving channel reported from the W-CDMA receiver module 7, or the active application program reported from the active application determining section 12, is periodically monitored, and the antenna switching number and the values of I and Q are switched according to the receiving channel and the active application program at each monitored time.

Embodiment 3

Figure 10:
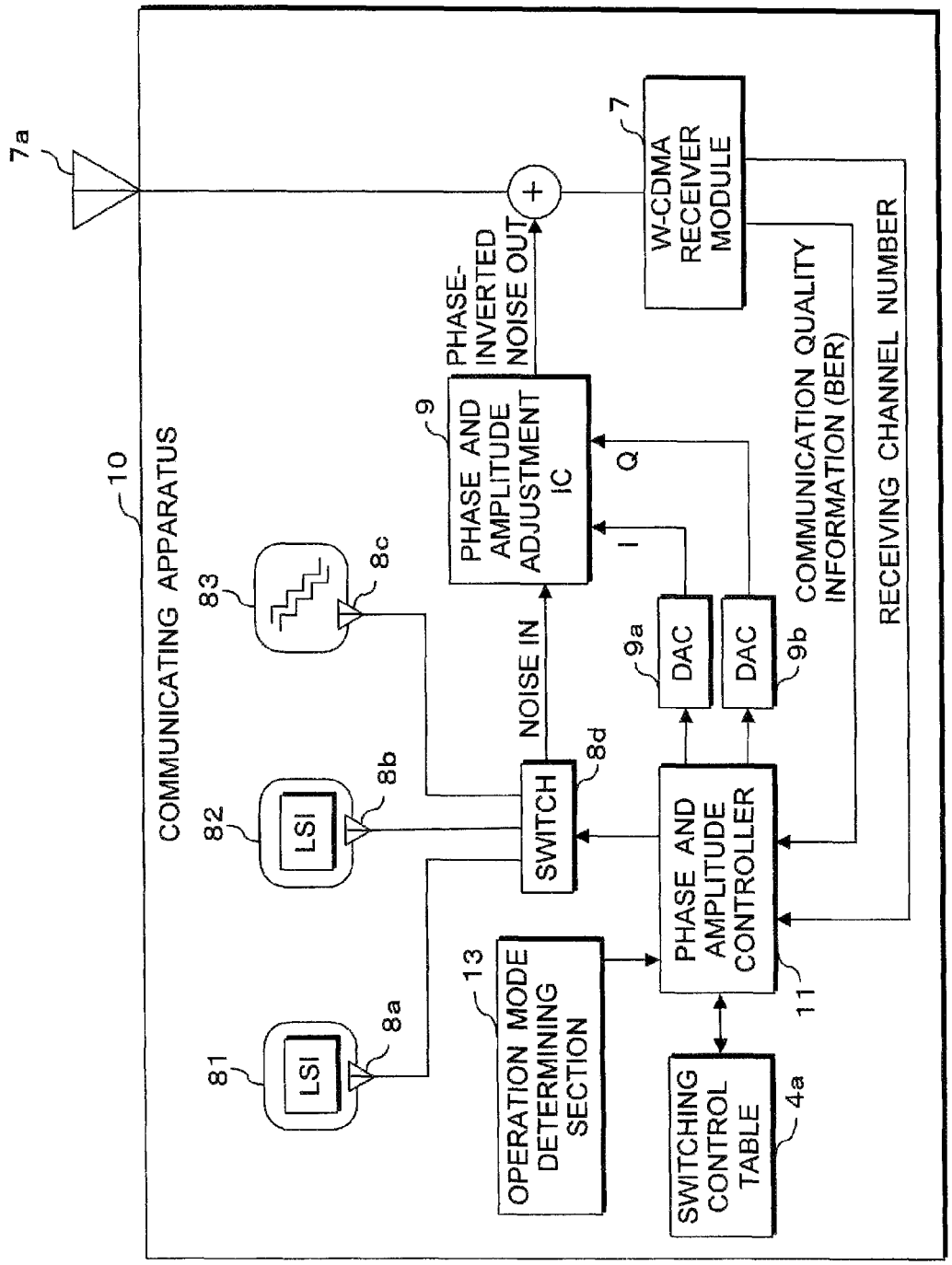
FIG. 10 is a functional block diagram showing the functions of a communicating apparatus of Embodiment 3.

The following will explain in detail a communicating apparatus of the present invention, based on the drawings illustrating Embodiment 3. FIG. 10 is a functional block diagram showing the functions of the communicating apparatus of Embodiment 3. Since the communicating apparatus of Embodiment 3 has structures similar to the above-described communicating apparatus 10 of Embodiment 1, similar structures are designated with the same codes and the explanation thereof is omitted.

The communicating apparatus 10 of Embodiment 2 described above controls the switching operation of the switch 8d and the values of I and Q to be inputted to the phase and amplitude adjustment IC 9, according to a receiving channel when receiving a reception signal and the kind of an application program being run. The communicating apparatus 10 of Embodiment 3 uses the operation mode of the communicating apparatus 10 instead of the kind of the application program being run, and controls the switching operation of the switch 8d and the values of I and Q to be inputted to the phase and amplitude adjustment IC 9, according to the receiving channel and the operation mode.

More specifically, the communicating apparatus 10 of Embodiment 3 stores an operation mode determining program (not shown) in the HDD 4, and the control section 1 realizes the operation of an operation mode determining section 13 shown in FIG. 10 by reading the operation mode determining program into the RAM 3 and running the program. The operation mode determining section 13 determines an operation mode of the communicating apparatus 10 and reports the determined operation mode to the phase and amplitude controller 11.

Here, if the communicating apparatus 10 as a notebook personal computer is also designed to be capable of being used as a tablet PC (Personal Computer), then the operation mode (use mode) means a notebook operation mode and a tablet operation mode. More specifically, the notebook operation mode is a state in which the display section 6 such as an LCD is open to the operation section 5, such as a keyboard, (the LCD opened state); and the tablet operation mode is a state in which the display section 6 is closed to the operation section 5 (the LCD closed state).

Hence, the operation mode determining section (determining means) 13 determines whether the communicating apparatus 10 is used in the notebook operation mode or the tablet operation mode, and reports the determined operation mode to the phase and amplitude controller 11. In some notebook personal computer, the display section 6 has a communicating antenna 7a at suitable position which is distant from the operation section 5 when the display section 6 is opened to the operation section 5. In such a communicating apparatus 10, the noise sources 81, 82 and 83 that affect reception signals differ depending on whether the display section 6 is in the opened state or the closed state.

In Embodiment 3, therefore, by appropriately controlling the switching operation of the switch 8d and the values of I and Q to be inputted to the phase and amplitude adjustment IC 9 according not only to a receiving channel when receiving a reception signal, but also to the opened state or the closed state of the display section 6, it is possible to perform an accurate noise canceling process. When the communicating apparatus 10 disclosed in the present application is applied to a cell phone, it is similarly possible to construct a structure in which the operation mode is either a state in which the display section 6 (display screen) is opened to the operation section 5 (operation keys) or a state in which the display section 6 is closed, and the switching operation of the switch 8d and the values of I and Q to be inputted to the phase and amplitude adjustment IC 9 are controlled according to the receiving channel and the operation mode.

In Embodiment 3, the switching control table 4a stored in the HDD 4 of the communicating apparatus 10 is a switching control table 4a as shown in FIG. 11. FIG. 11 is a schematic view showing the stored contents of the switching control table 4a of Embodiment 3. As shown in FIG. 11, in the switching control table 4a of Embodiment 3, an antenna switching number and the values of I and Q which are noise canceling parameters preset for each receiving channel are stored in association with each receiving channel number and information indicating an operation mode.

In the column of operation mode, the LCD opened state or the LCD closed state is stored. Thus, in the switching control table 4a of Embodiment 3, for each receiving channel and each operation mode, an antenna switching number and values of I and Q capable of optimally canceling noise signals (noise signals from the noise sources 81, 82, 83) affecting a reception signal are stored according to the operation mode at the time of receiving a reception signal on each receiving channel.

The following will explain the phase and amplitude control process performed by the phase and amplitude controller 11 of Embodiment 3. As explained in Embodiment 1, the phase and amplitude controller 11 determines, based on the receiving channel number reported from the W-CDMA receiver module 7, whether or not the receiving channel for receiving a radio wave has been changed. The phase and amplitude controller 11 of Embodiment 3 successively stores the operation mode information reported from the operation mode determining section 13 in its memory by rewriting. Based on whether or not the operation mode reported from the operation mode determining section 13 matches the previously reported operation mode, that is, the operation mode stored already in the memory, the phase and amplitude controller 11 determines whether or not the operation mode has been changed.

When determined that the receiving channel has not been changed, or that the operation mode has not been changed, the phase and amplitude controller 11 does nothing. When the phase and amplitude controller 11 determines that the receiving channel has been changed, it reads from the switching control table 4a the antenna switching number and the values of I and Q corresponding to, the receiving channel number of the changed receiving channel and the operation mode at this time. Moreover, when the phase and amplitude controller 11 determines that the operation mode has been changed, it reads from the switching control table 4a the antenna switching number and the values of I and Q corresponding to, the receiving channel number at this time and the changed operation mode.

Then, the phase and amplitude controller 11 transmits the antenna switching number read from the switching control table 4a to the switch 8d, and transmits the value of I to the DAC 9a and the value of Q to the DAC 9b. Accordingly, the switch 8d selects either the first noise capture antenna 8a, second noise capture antenna 8b, or third noise capture antenna 8c, according to the antenna switching number obtained from the phase and amplitude controller 11, and transmits a noise signal obtained from the selected noise capture antenna 8a (or 8b or 8c) to the phase and amplitude adjustment IC 9.

Hence, when receiving a reception signal on each receiving channel, the phase and amplitude controller 11 can easily specify from the switching control table 4a the antenna switching number and values of I and Q for appropriately canceling a noise signal from the reception signal, according to the operation mode (the LCD opened state or the LCD closed state) at this time. Moreover, the phase and amplitude adjustment IC 9 adjusts the phase and amplitude of the noise signal inputted from the switch 8d according to such an antenna switching number by using the values of I and Q inputted through the DACs 9a and 9b, inverts the phase of the adjusted signal, and adds the resulting signal to a reception signal received by the communication antenna 7a, thereby capable of appropriately canceling the noise signal from the reception signal. Thus, the W-CDMA receiver module 7 can obtain a reception signal from which noise signals were appropriately canceled.

Note that the adjustment process in which the phase and amplitude controller 11 finely adjusts the values of I and Q to be transmitted to the DACs 9a and 9b, based on the communication quality information reported from the W-CDMA receiver module 7, is similar to the process explained in Embodiment 1.

With the above-mentioned process, when receiving a reception signal through the communication antenna 7a, the communicating apparatus 10 of Embodiment 3 can add to the reception signal a signal based on a noise signal detected by the noise capture antenna 8a (or 8c or 8c) corresponding to the receiving channel and the operation mode of the communicating apparatus 10 at this time, and therefore it is possible to optimally cancel the noise signal from the reception signal. Moreover, with only the process in which the phase and amplitude controller 11 refers to the switching control table 4a, it is possible to easily specify the noise capture antenna 8a (or 8b or 8c) for detecting a noise signal to be canceled from a reception signal and the values of I and Q.

Figure 12:
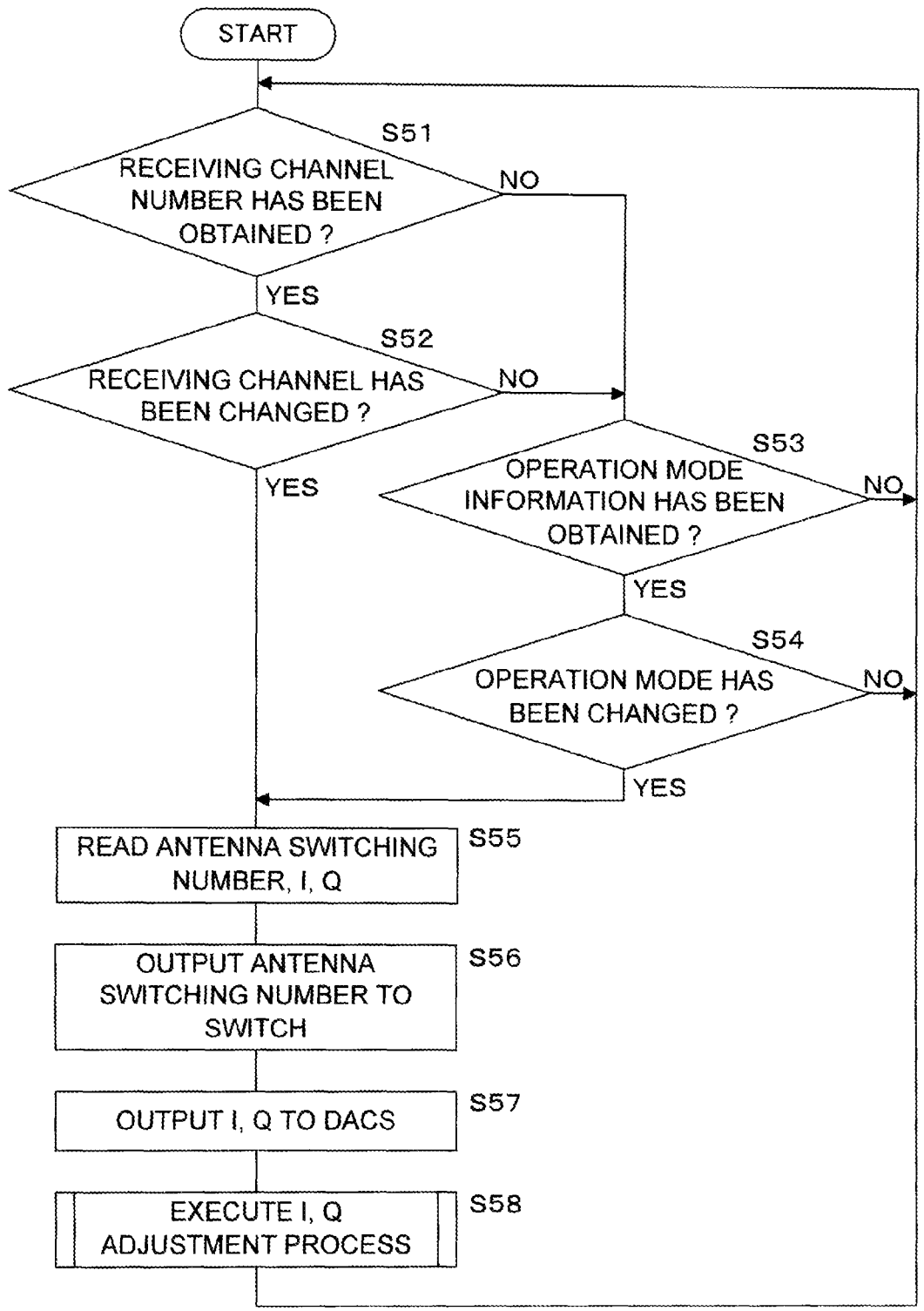
FIG. 12 is a flow chart showing the steps of a phase and amplitude control process of Embodiment 3.

The following will explain, based on the flow chart, the phase and amplitude control process performed by the phase and amplitude controller 11 in the communicating apparatus 10 having the above-described structure. FIG. 12 is the flow chart showing the steps of the phase and amplitude control process of Embodiment 3. The following process is executed by the control section 1 according to the phase and amplitude controlling program 4b stored in the HDD 4 of the communicating apparatus 10.

The control section 1 (phase and amplitude controller 11) of the communicating apparatus 10 determines whether or not a receiving channel number has been obtained from the W-CDMA receiver module 7 (S51). When the control section 1 determines that a receiving channel number has been obtained (S51: YES), it determines whether or not the receiving channel for receiving a reception signal has been changed (S52). When the control section 1 determines that the receiving channel has been changed (S52: YES), it moves the process to step S55.

When determined that a receiving channel number has not been obtained (S51: NO), or determined that the receiving channel has not been changed (S52: NO), the control section 1 determines whether or not the operation mode information has been obtained from the operation mode determining section 13 (S53). When the control section 1 determines that the operation mode information has been obtained (S53: YES), it determines whether or not the operation mode has been changed (S54). When the control section 1 determines that the operation mode has been changed (S54: YES), it moves the process to step S55.

When determined that the operation mode information has not been obtained (S53: NO), or determined that the operation mode has not been changed (S54: NO), the control section 1 returns the process to step S51 and waits until the receiving channel is changed or the operation mode is changed, while performing other process.

When determined that the receiving channel has been changed (S52: YES), or determined that the operation mode has been changed (S54: YES), the control section 1 reads the antenna switching number and the values of I and Q corresponding to the receiving channel and the operation mode at this time from the switching control table 4*a* (S55). The control section 1 outputs the antenna switching number read from the switching control table 4*a* to the switch 8*d* (S56), and outputs the values of I and Q read from the switching control table 4*a* to the DACs 9*a* and 9*b*, respectively (S57).

The control section 1 executes the adjustment process for finely adjusting the values of I and Q to be transmitted to the DACs 9*a* and 9*b*, based on the communication quality information reported from the W-CDMA receiver module 7 (S58), and returns the process to step S51. The control section 1 repeats the process of steps S55 to S58 whenever the receiving channel or the operation mode is changed. Note that the adjustment process for the values I and Q in step S58 is the process explained with reference to FIGS. 6A and 6B.

As described above, the communicating apparatus 10 of Embodiment 3 switches the noise signals to be inputted to the phase and amplitude adjustment IC 9 (noise signals detected by the noise capture antenna 8*a*, 8*b*, 8*c*), according to the receiving channel when receiving a reception signal and the operation mode, and also switches the values of I and Q to be inputted to the phase and amplitude adjustment IC 9. Thus, since the communicating apparatus 10 can optimally cancel a noise signal contained in a reception signal received on each receiving channel according to the receiving channel and the operation mode, it is possible to improve the communication quality of a reception signal, and it is possible to obtain the reception signal with good communication quality.

Embodiment 3 described above illustrates, as an example, a structure in which the operation modes of the communicating apparatus 10 are the LCD opened state and the LCD closed state, and, when the state of the LCD is changed, the switching operation of the switch 8*d* and the values of I and Q to be inputted to the phase and amplitude adjustment IC 9 are controlled. In addition to such a structure, for example, it may be possible to construct a structure in which the switching operation of the switch 8*d* and the values of I and Q to be inputted to the phase and amplitude adjustment IC 9 are controlled according to the open angle of the display section 6 with respect to the operation section 5. In this case, it is possible to perform more precise control according to the opened state of the display section 6 with respect to the operation section 5.

Embodiment 3 described above illustrates, as an example, a structure in which the antenna switching number to be transmitted to the switch 8*d* and the values of I and Q to be transmitted to the DACs 9*a* and 9*b* are switched when the phase and amplitude controller 11 determines that the receiving channel reported from the W-CDMA receiver module 7 has been changed, or that the operation mode reported from the operation mode determining section 13 has been changed. In addition to such a structure, for example, it may be possible to construct a structure in which the receiving channel reported from the W-CDMA receiver module 7, or the operation mode reported from the operation mode determining section 13, is periodically monitored, and the antenna switching number and the values of I and Q are switched according to the receiving channel and operation mode at each monitored time.

Embodiment 4

The following will explain in detail a communicating apparatus of the present invention, based on the drawings illustrating Embodiment 4. Since the communicating apparatus of Embodiment 4 has structures similar to the above-described communicating apparatus 10 of Embodiment 1, similar structures are designated with the same codes and the explanation thereof is omitted.

The communicating apparatus 10 of Embodiment 1 described above controls the switching operation of the switch 8*d* and the values of I and Q to be inputted to the phase and amplitude adjustment IC 9, according to the receiving channel when receiving a reception signal. The communicating apparatus 10 of Embodiment 4 stores a plurality of antenna switching numbers for the switching operation of the switch 8*d* and values of I and Q as setting conditions, performs noise cancellation based on each setting condition when controlling the switching operation of the switch 8*d* and the values of I and Q to be inputted to the phase and amplitude adjustment IC 9, and uses a setting condition that provided the best communication quality.

In Embodiment 4, the switching control table 4*a* stored in the HDD 4 of the communicating apparatus 10 is a switching control table 4*a* as shown in FIG. 13. FIG. 13 is a schematic view showing the stored contents of the switching control table 4*a* of Embodiment 4. As shown in FIG. 13, in the switching control table 4*a* of Embodiment 4, an antenna switching number and the values of I and Q, which are noise canceling parameters preset for each receiving channel, are stored in association with a setting number for identifying each setting condition.

The following will explain the phase and amplitude control process performed by the phase and amplitude controller 11 of Embodiment 4. Based on a reception signal received through the communication antenna 7*a*, the W-CDMA receiver module 7 detects communication quality information indicating the communication quality of the reception signal periodically (at any time), and reports the detected communication quality information to the phase and amplitude controller 11 whenever the communication quality information is detected. The phase and amplitude controller 11 determines, based on the communication quality information reported properly from the W-CDMA receiver module 7, whether or not the communication quality has deteriorated.

More specifically, when the phase and amplitude controller (obtaining means) 11 obtains the communication quality information from the W-CDMA receiver module 7, it determines whether or not the obtained communication quality information (communication quality) shows a numerical value within a predetermined range. Numerical values showing the predetermined range are stored in the ROM 2, or the HDD 4, in advance. For example, when the BER is used as the communication quality information, it is possible to set "$1.0 \times 10^{-4}$% or more" as the predetermined range.

When determined that the communication quality information obtained from the W-CDMA receiver module 7 is within the predetermined range, that is, the communication quality is maintained at the predetermined range or better level, the phase and amplitude controller 11 does nothing. On the other hand, when determined that the communication quality information obtained from the W-CDMA receiver module 7 is out of the predetermined range, that is, the communication quality has deteriorated beyond the predetermined range, the phase and amplitude controller 11 reads one of the setting conditions stored in the switching control table 4a, transmits the antenna switching number to the switch 8d, and the value of I to the DAC 9a and the value of Q to the DAC 9b.

Accordingly, the switch 8d selects either the first noise capture antenna 8a, second noise capture antenna 8b, or third noise capture antenna 8c, according to the antenna switching number obtained from the phase and amplitude controller 11, and transmits a noise signal obtained from the selected noise capture antenna 8a (or 8b or 8c) to the phase and amplitude adjustment IC 9. The phase and amplitude adjustment IC 9 adjusts the phase and amplitude of the noise signal inputted from the switch 8d by using the values of I and Q inputted through the DACs 9a and 9b, inverts the phase of the obtained signal, and adds the resulting signal to a reception signal obtained by the communication antenna 7a, thereby canceling the noise signal from the reception signal.

The W-CDMA receiver module 7 obtains the reception signal from which the noise signal was canceled in such a manner, detects the communication quality information of the obtained reception signal, and reports the detected communication quality information to the phase and amplitude controller 11. The phase and amplitude controller 11 stores the obtained communication quality information in the RAM 3 in association with the setting number of the setting condition at this time.

By performing the above-mentioned process for all the setting conditions stored in the switching control table 4a, the phase and amplitude controller 11 obtains the communication quality information about the respective setting conditions, and stores the information in the RAM 3. When the communication quality information corresponding to all the setting conditions stored in the switching control table 4a is stored in the RAM 3, the phase and amplitude controller (specifying means) 11 specifies the best communication quality information and specifies a setting condition that provided this communication quality information. Then, the phase and amplitude controller 11 transmits the antenna switching number of the specified setting condition to the switch 8d, and transmits the value of I to the DAC 9a and the value of Q to the DAC 9b.

Thus, the phase and amplitude controller 11 can specify a setting condition capable of providing the best communication quality information among the setting conditions stored in the switching control table 4a, and can appropriately cancel a noise signal from a reception signal based on such a setting condition. As the predetermined range used as a criterion for determining whether or not the communication quality information is satisfactory, different values may be set according to the kind of a reception signal received, or may be suitably changed.

Moreover, when the noise canceling process based on the setting condition capable of providing the best communication quality information as described above is started, the phase and amplitude controller 11 also performs the adjustment process for finely adjusting the values of I and Q to be transmitted to the DACs 9a and 9b, based on the communication quality information reported from the W-CDMA receiver module 7 at any time. This adjustment process is similar to the process explained in Embodiment 1.

With the above-mentioned process, the communicating apparatus 10 of Embodiment 4 can reset the setting condition capable of providing the best communication quality at optimum timing, such as when the communication quality of the reception signal received through the communication antenna 7a has deteriorated.

Figure 14A:
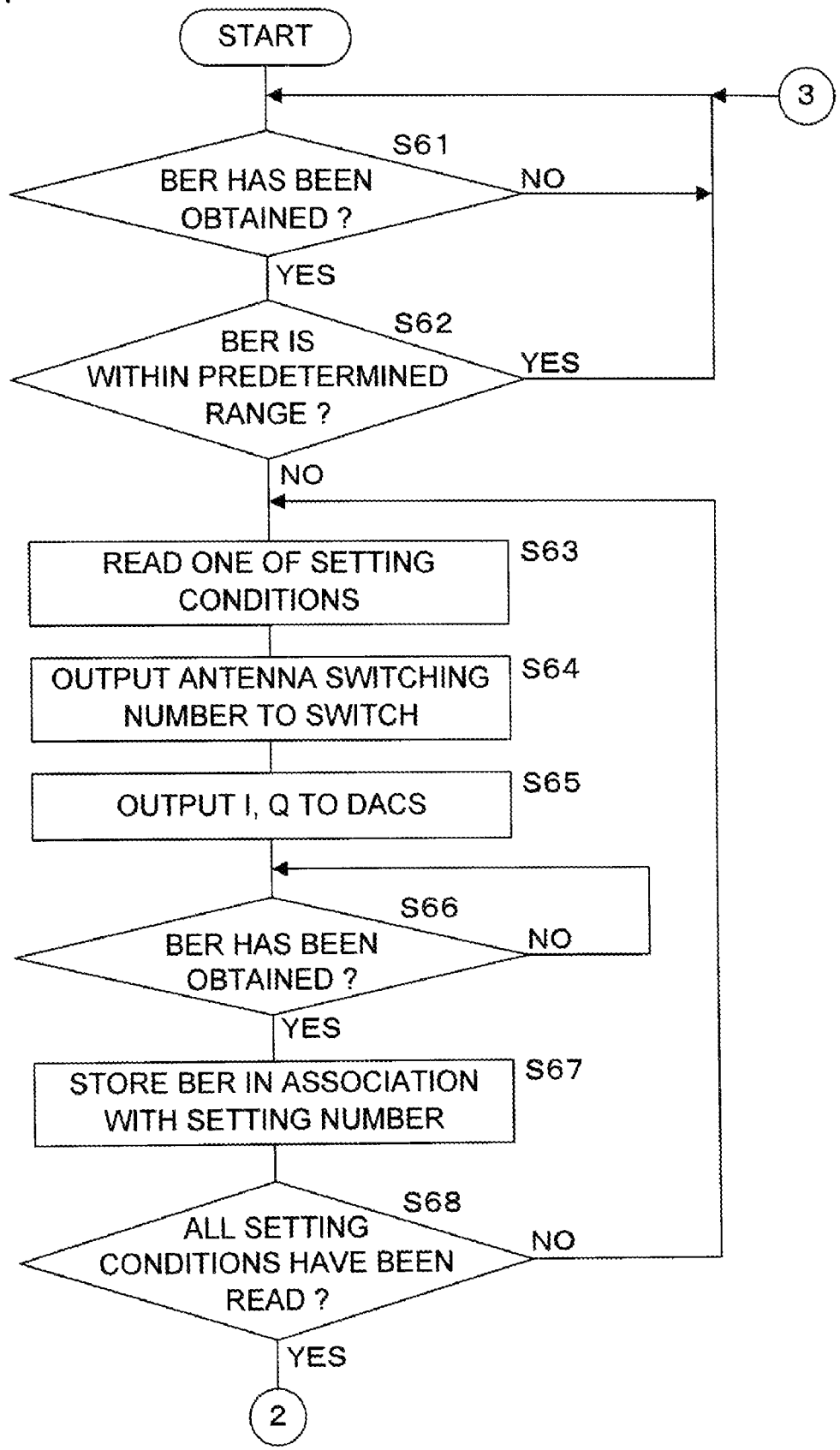
FIGS. 14A and 14B are flow charts showing the steps of a phase and amplitude control process of Embodiment 4.
Figure 14B:
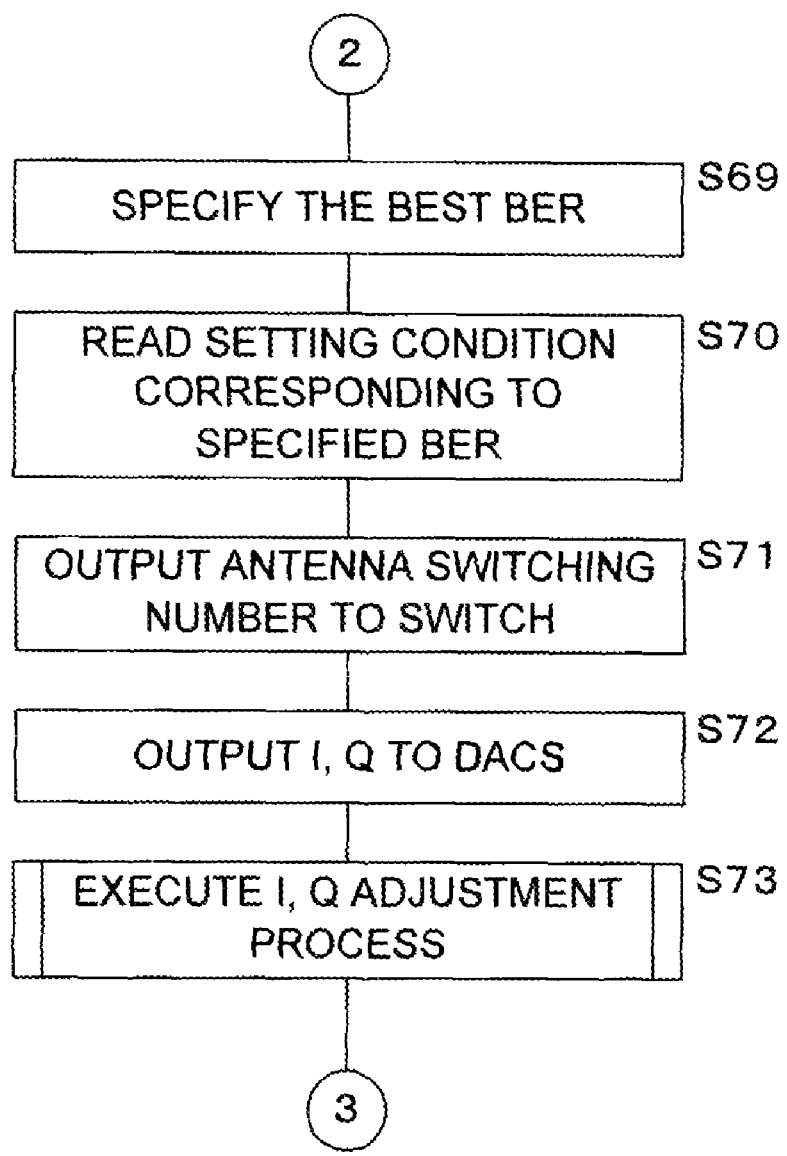

The following will explain, based on the flow chart, the phase and amplitude control process performed by the phase and amplitude controller 11 in the communicating apparatus 10 having the above-described structure. FIGS. 14A and 14B are the flow charts showing the steps of the phase and amplitude control process of Embodiment 4. The following process is executed by the control section 1 according to the phase and amplitude controlling program 4b stored in the HDD 4 of the communicating apparatus 10.

The control section 1 (phase and amplitude controller 11) of the communicating apparatus 10 determines whether or not the communication quality information (hereinafter referred to as the BER) has been obtained from the W-CDMA receiver module 7 (S61). When the control section 1 determines that the communication quality information has not been obtained (S61: NO), it waits while performing other process. When the control section 1 determines that the BER has been obtained (S61: YES), it determines whether or not the obtained BER is within a predetermined range (S62). When the control section 1 determines that the obtained BER is within the predetermined range (S62: YES), it returns the process to step S61 and waits while performing other process.

When the control section 1 determines that the obtained BER is not within the predetermined range (S62: NO), it reads one of the setting conditions stored in the switching control table 4a (S63). The control section 1 outputs the antenna switching number in the read setting condition to the switch 8d (S64), and the values of I and Q in the read setting condition to the DACs 9a and 9b, respectively (S65).

The control section 1 determines whether or not the BER has been obtained from the W-CDMA receiver module 7 (S66). When the control section 1 determines that the BER has not been obtained (S66: NO), it waits until the BER is received. When the control section 1 determines that the BER has been obtained from the W-CDMA receiver module 7 (S66: YES), it stores the BER in the RAM 3 in association with the setting number of the setting condition read in step S63 (S67).

The control section 1 determines whether or not all the setting conditions stored in the switching control table 4a have been read (S68). When determined that all the setting conditions have not been read (S68: NO), the control section 1 returns the process to step S63 and repeats the process of steps S63 to S68. When determined that all the setting conditions stored in the switching control table 4a have been read (S68: YES), the control section 1 specifies the best BER by comparing the BERs stored in association with the setting numbers in the RAM 3 in step S67 (S69).

Based on the setting number stored in the RAM 3 in association with the specified BER, the control section 1 reads a setting condition corresponding to the BER from the switching control table 4*a* (S70), outputs the antenna switching number in the read setting condition to the switch 8*d* (S71), and outputs the values of I and Q in the read setting condition to the DACs 9*a* and 9*b*, respectively (S72).

Moreover, the control section 1 executes the adjustment process for finely adjusting the values of I and Q to be transmitted to the DACs 9*a* and 9*b*, based on the communication quality information reported from the W-CDMA receiver module 7 (S73), and returns the process to step S61. The control section 1 repeats the process of steps S63 to S73 whenever the BER is out of the predetermined range. Note that the adjustment process for the values of I and Q in step S73 is the process explained with reference to FIGS. 5 and 6.

As described above, the communicating apparatus 10 of Embodiment 4 specifies a setting condition capable of providing the best communication quality information among the setting conditions stored in the switching control table 4*a*, switches the noise signals to be inputted to the phase and amplitude adjustment IC 9 (noise signals detected by the noise capture antenna 8*a*, 8*b*, 8*c*), and also switches the values of I and Q to be inputted to the phase and amplitude adjustment IC 9, according to the specified setting condition. Accordingly, since the communicating apparatus 10 can optimally cancel a noise signal contained in a reception signal received, it is possible to improve the communication quality of a reception signal, and it is possible to obtain the reception signal with good communication quality.

Embodiment 4 described above illustrates, as an example, a structure in which, when the communication quality information reported from the W-CDMA receiver module 7 deteriorates beyond the predetermined range, the phase and amplitude controller 11 performs the control process so as to select a setting condition capable of providing the best communication quality. In addition to such a structure, for example, it may be possible to include a structure for determining an active application program like the communicating apparatus 10 of Embodiment 2 and perform a control process to select a setting condition capable of providing the best communication quality when the active application program is changed.

Moreover, it may be possible to include a structure for determining an operation mode of the communicating apparatus 10 like the communicating apparatus 10 of Embodiment 3 and perform a control process to select a setting condition capable of providing the best communication quality when the operation mode of the communicating apparatus 10 is changed. Further, it may be possible to construct a structure in which the control process is performed periodically to select a setting condition capable of providing the best communication quality.

Embodiments 1 to 4 described above illustrate, as an example, a structure in which the phase and amplitude controller 11 is realized by executing the phase and amplitude control program 4*b* with the control section 1. In addition to this structure, it may be possible to construct a structure in which, for example, the W-CDMA receiver module 7 is designed to perform the function of the phase and amplitude controller 11.

Embodiments 1 to 4 described above illustrate, as an example, a structure in which a receiving channel when the communication antenna 7*a* receives a reception signal is specified by the W-CDMA receiver module 7 according to an instruction from a nearby base station or a specification from a user, and optimum noise canceling parameters (the antenna switching number for use in the switching process performed by the switch 8*d* and the values of I and Q) in the condition where the receiving channel is specified are specified from the switching control table 4*a*.

It is also possible to construct a structure in which, in addition to the condition where a receiving channel is specified, when a receiving channel for receiving a reception channel from the base station is specified by scanning a plurality of receiving channels in a short time at the time of starting communication, optimum noise canceling parameters (the antenna switching number for use in the switching process performed by the switch 8*d* and the values of I and Q) are specified for each receiving channel from the switching control table 4*a*. In this case, even in a condition where the communicating apparatus 10 is located far away from the base station and the noise signal is relatively too strong due to attenuation of a reception signal from the base station, it is possible to optimally cancel the noise signal. Therefore, it is possible to accurately receive a reception signal from the base station, and it is possible to start communication.

In the communicating apparatus disclosed in the present application, the detecting-means information indicating detecting means for detecting a noise signal generated from a radio noise source that affects a reception signal received on each receiving channel, and noise canceling parameters for canceling a noise signal from a reception signal received on each receiving channel are stored in the parameter table in association with each receiving channel and operation state. According to the communicating apparatus disclosed in the present application, based on the information read from the parameter table based on a receiving channel and an operation state, it is possible to satisfactorily cancel a noise signal that affects a reception signal received on each receiving channel according to the operation state. Therefore, even when the radio noise source that affects a reception signal is different in different operation states, it is possible to appropriately cancel a noise signal affecting a reception signal in each operation state.

In the communicating apparatus disclosed in the present application, the detecting-means information indicating detecting means for detecting a noise signal generated from a radio noise source that affects a reception signal received on each receiving channel and noise canceling parameters for canceling a noise signal from a reception signal received on each receiving channel are stored in the parameter table in association with each receiving channel and use mode. According to the communicating apparatus disclosed in the present application, based on the information read from the parameter table according to a receiving channel and a use mode, it is possible to satisfactorily cancel a noise signal that affects a reception signal received on each receiving channel according to the use mode. Therefore, even when the radio noise source that affects a reception signal is different in different use modes, it is possible to appropriately cancel a noise signal affecting a reception signal in each use mode.

In the communicating apparatus disclosed in the present application, the detecting-means information indicating detecting means for detecting a noise signal generated from a radio noise source that affects a reception signal received on each receiving channel and noise canceling parameters for canceling a noise signal from a reception signal received on each receiving channel are stored in the parameter table in association with each receiving channel and application program being run. According to the communicating apparatus disclosed in the present application, based on the information read from the parameter table according to a receiving channel and an application program being run, it is possible to satisfactorily cancel a noise signal affecting a reception signal received on each receiving channel according to the kind of the application program being run. Therefore, even when the radio noise source that affects a reception signal is different for different application programs being run, it is possible to appropriately cancel a noise signal affecting a reception signal for each application program being run.

According to the communicating apparatus disclosed in the present application, when the operation state is changed, information corresponding to the receiving channel and the operation state is read from the parameter table, and a noise signal is canceled from a reception signal based on the read information. It is therefore possible to perform the noise canceling process at appropriate timing.

In the communicating apparatus disclosed in the present application, in association with the detecting-means information indicating detecting means for detecting a noise signal generated from a radio noise source, noise canceling parameters for canceling a noise signal from a reception signal are stored in the parameter table. According to the communicating apparatus disclosed in the present application, based on the detecting-means information and noise canceling parameters stored in the parameter table, noise signals are successively canceled from reception signals, and the detecting-means information and noise canceling parameters capable of providing the best communication quality among the communication quality of the reception signals from which noise signals were canceled are specified. In the communicating apparatus disclosed in the present application, since a noise signal is canceled from a reception signal based on the specified detecting-means information and noise canceling parameters, it is possible to perform the noise canceling process capable of providing the best communication quality.

According to the communicating apparatus disclosed in the present application, when the communication quality based on a reception signal is out of the predetermined range, the detecting-means information and noise canceling parameters optimum for removing the noise signal from the reception signal are specified, and therefore it is possible to perform the noise canceling process at appropriate timing.

The communicating apparatus disclosed in the present application has the advantageous effect that makes it possible to easily specify, based on the parameter table, a radio noise source that affects a reception signal received on each receiving channel and noise canceling parameters for satisfactorily canceling a noise signal from a reception signal received on each receiving channel. The communicating apparatus disclosed in the present application has the advantageous effect that makes it possible to optimally cancel a noise signal affecting a reception signal from the reception signal, based on the noise signal generated from the radio noise source and noise canceling parameters specified in such a manner.

The communicating apparatus disclosed in the present application stores a plurality of radio noise sources that affect reception signals and noise canceling parameters for satisfactorily canceling noise signals from reception signals in association with each other as setting conditions for the process of canceling a noise signal from a reception signal in the parameter table, and cancels a noise signal from a reception signal by using a setting condition capable of providing the best communication quality among these setting conditions. It is therefore possible to execute the noise canceling process capable of providing the best communication quality.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communicating apparatus comprising:
   a receiver for receiving a reception signal from an external device on any of a plurality of receiving channels;
   a plurality of detectors for detecting noise signals that are generated from a plurality of radio noise sources, respectively;
   a parameter table in which detector information indicating any of said detectors and preset noise canceling parameters are stored in association with each receiving channel;
   a reading section for reading from the parameter table the detector information and noise canceling parameters corresponding to a receiving channel when receiving a reception signal by said receiver;
   a selecting section for selecting, based on the detector information read by said reading section, a detector indicated by the detector information; and
   a canceling section for canceling, based on a noise signal detected by the detector selected by said selecting section and the noise canceling parameters read by said reading section, a noise signal from a reception signal received by said receiver.

2. The communicating apparatus according to claim 1, comprising a determining section for determining an operation state, wherein
   the detector information and the noise canceling parameters are stored in association with each receiving channel and operation state in the parameter table, and
   said reading section reads from the parameter table the detector information and noise canceling parameters corresponding to a receiving channel, when receiving a reception signal by said receiver, and the operation state determined by said determining section.

3. The communicating apparatus according to claim 2, wherein
   the communicating apparatus is capable of being used in a plurality of use modes,
   the detector information and noise canceling parameters are stored in association with each receiving channel and each use mode in the parameter table,
   said determining section determines a use mode, and
   said reading section reads from the parameter table the detector information and noise canceling parameters corresponding to a receiving channel, when receiving a reception signal by said receiver, and the use mode determined by said determining section.

4. The communicating apparatus according to claim 2, comprising an executing section for running each of a plurality of programs, wherein
   the detector information and noise canceling parameters are stored in association with each receiving channel and information indicating any of the programs in the parameter table,
   said determining section determines a program being run by said executing section, and said reading section reads from the parameter table the detector information and noise canceling parameters corresponding to a receiving channel, when receiving a reception signal by said receiver, and the program determined to be running by said determining section.

5. The communicating apparatus according to claim 2, comprising a section for determining, based on the operation state determined by said determining section, whether or not the operation state has changed, wherein when a determination is made that the operation state has changed, said reading section reads from the parameter table the detector information and noise canceling parameters corresponding to a receiving channel, when receiving a reception signal by said receiver, and the operation state determined by said determining section.

6. A communicating apparatus comprising:
a receiver for receiving a reception signal from an external device on any of a plurality of receiving channels;
a plurality of detectors for detecting noise signals that are generated from a plurality of radio noise sources, respectively;
a parameter table in which detector information indicating any of said detectors and preset noise canceling parameters are stored in association with each receiving channel; and
a controller capable of performing the steps of:
reading from the parameter table the detector information and noise canceling parameters corresponding to a receiving channel when receiving a reception signal by said receiver;
selecting, based on the detector information read from the parameter table, a detector indicated by the detector information; and
canceling a noise signal from a reception signal received by said receiver based on a noise signal detected by the selected detector and the noise canceling parameters read from the parameter table.

7. The communicating apparatus according to claim 6, wherein
the detector information and the noise canceling parameters are stored in association with each receiving channel and operation state in the parameter table, and
said controller determines an operation state, and reads the detector information and noise canceling parameters corresponding to a receiving channel, when receiving a reception signal by said receiver, and the determined operation state from the parameter table.

8. The communicating apparatus according to claim 7, wherein
the communicating apparatus is capable of being used in a plurality of use modes,
the detector information and noise canceling parameters are stored in association with each receiving channel and each use mode in the parameter table, and
said controller determines a use mode, and reads the detector information and noise canceling parameters corresponding to a receiving channel, when receiving a reception signal by said receiver, and the determined use mode from the parameter table.

9. The communicating apparatus according to claim 7, wherein
said controller runs each of a plurality of programs,
the detector information and noise canceling parameters are stored in association with each receiving channel and information indicating any of the programs in the parameter table, and said controller determines a program being run, and reads the detector information and noise canceling parameters corresponding to a receiving channel, when receiving a reception signal by said receiver, and the program determined to be running from the parameter table.

10. The communicating apparatus according to claim 7, wherein
said controller determines, based on the determined operation state, whether or not the operation state has changed, and reads the detector information and noise canceling parameters corresponding to a receiving channel, when receiving a reception signal by said receiver, and the determined operation state from the parameter table when determined that the operation state has changed.

11. A communicating apparatus comprising:
a receiver for receiving a reception signal from an external device on any of a plurality of receiving channels;
a plurality of detectors for detecting noise signals that are generated from a plurality of radio noise sources, respectively;
a parameter table in which preset noise canceling parameters are stored in association with detector information indicating each of said detectors;
a reading section for successively reading the detector information and noise canceling parameters stored in the parameter table;
a selecting section for successively selecting a detector indicated by the detector information read by said reading section;
a canceling section for successively canceling a noise signal from a reception signal received by said receiver, based on a noise signal detected by the detector selected by said selecting section and the noise canceling parameters read by said reading section;
an obtaining section for obtaining communication quality information indicating communication quality of the reception signal from which the noise signal was canceled by said canceling section; and
a specifying section for specifying detector information and noise canceling parameters corresponding to the best communication quality information among the communication quality information obtained by said obtaining section, wherein
said selecting section selects a detector indicated by the detector information specified by said specifying section, and
said canceling section cancels a noise signal from a reception signal received by said receiver, based on a noise signal detected by the selected detector and the noise canceling parameters specified by said specifying section.

12. The communicating apparatus according to claim 11, wherein
said obtaining section obtains communication quality information indicating communication quality of a reception signal at any time, and
said reading section determines whether or not the communication quality indicated by the communication quality information is within a predetermined range whenever said obtaining section obtains the communication quality information, and successively reads the detector information and noise canceling parameters stored in the parameter table when determined that the communication quality is out of the predetermined range.

13. A communicating apparatus comprising:
a receiver for receiving a reception signal from an external device on any of a plurality of receiving channels;
a plurality of detectors for detecting noise signals that are generated from a plurality of radio noise sources, respectively;
a parameter table in which preset noise canceling parameters are stored in association with detector information indicating each of said detectors; and
a controller capable of performing the steps of:
successively reading the detector information and noise canceling parameters stored in the parameter table;
successively selecting a detector indicated by the read detector information;
successively canceling a noise signal from a reception signal received by said receiver, based on a noise signal detected by the selected detector and the read noise canceling parameters;
obtaining communication quality information indicating communication quality of the reception signal from which the noise signal was canceled;
specifying detector information and noise canceling parameters corresponding to the best communication quality information among the obtained communication quality information;
selecting a detector indicated by the specified detector information; and
canceling a noise signal from a reception signal received by said receiver, based on a noise signal detected by the selected detector and specified noise canceling parameters.

14. The communicating apparatus according to claim 13, wherein
said controller obtains communication quality information indicating communication quality of a reception signal at any time, determines whether or not the communication quality indicated by the communication quality information is within a predetermined range whenever the communication quality information is obtained, and successively reads the detector information and noise canceling parameters stored in the parameter table when determined that the communication quality is out of the predetermined range.

15. A noise canceling method comprising:
receiving, by a communicating apparatus, which comprises a receiver, a reception signal from an external device on any of a plurality of receiving channels, specifying any of a plurality of detectors for detecting noise signals that are generated by a plurality of radio noise sources, respectively, and preset noise canceling parameters corresponding to a receiving channel when receiving a reception signal by said receiver; and
cancelling, by said communicating apparatus, based on a noise signal detected by the specified detector and specified noise canceling parameters, a noise signal from a reception signal received by said receiver.

16. A non-transitory computer-readable memory product storing a computer program, said computer program comprising the steps of:
causing a computer to specify any of a plurality of detectors for detecting noise signals that are generated from a plurality of radio noise sources, respectively, and preset noise canceling parameters corresponding to a receiving channel when a receiver for receiving a reception signal from an external device on any of a plurality of receiving channels receives a reception signal; and
causing said computer to cancel, based on a noise signal detected by the specified detector and noise canceling parameters, a noise signal from a reception signal received by said receiver.

* * * * *